United States Patent
Ye

(10) Patent No.: US 9,231,822 B2
(45) Date of Patent: Jan. 5, 2016

(54) NOTIFYING OF A LSP FAILURE

(71) Applicant: Hangzhou H3C Technologies Co., Ltd., Hangzhou (CN)

(72) Inventor: Jinrong Ye, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/238,707

(22) PCT Filed: Oct. 12, 2012

(86) PCT No.: PCT/CN2012/082834
§ 371 (c)(1),
(2) Date: Feb. 12, 2014

(87) PCT Pub. No.: WO2013/053331
PCT Pub. Date: Apr. 18, 2013

(65) Prior Publication Data
US 2014/0254353 A1  Sep. 11, 2014

(30) Foreign Application Priority Data
Oct. 14, 2011 (CN) .......................... 2011 1 0312364

(51) Int. Cl.
| H04L 12/24 | (2006.01) |
| H04L 12/707 | (2013.01) |
| H04L 12/703 | (2013.01) |
| H04L 12/723 | (2013.01) |
| H04Q 11/00 | (2006.01) |

(52) U.S. Cl.
CPC ............ *H04L 41/0654* (2013.01); *H04L 45/22* (2013.01); *H04L 45/28* (2013.01); *H04L 45/50* (2013.01); *H04Q 2011/0077* (2013.01); *H04Q 2011/0081* (2013.01)

(58) Field of Classification Search
CPC .............. H04Q 2011/0077; H04Q 2011/0081; H04L 12/437; H04L 45/28; H04L 45/50; H04L 45/507; H04L 2012/5627
See application file for complete search history.

(56) References Cited

U.S. PATENT DOCUMENTS

| 7,359,377 B1 | 4/2008 | Kompella et al. |
| 8,233,387 B2 * | 7/2012 | Lu ........................... H04L 45/00 370/228 |

(Continued)

FOREIGN PATENT DOCUMENTS

| CN | 1756182 | 4/2006 |
| CN | 101667970 | 3/2010 |

(Continued)

OTHER PUBLICATIONS

CN First Office Action dated Sep. 3, 2013 issued on CN Patent Application No. 201110312364.X dated Oct. 14, 2011, The State Intellectual Property Office, P.R. China.

(Continued)

*Primary Examiner* — Xavier S. Wong
(74) *Attorney, Agent, or Firm* — Mannava & Kang, P.C.

(57) ABSTRACT

According to an example, in a method and apparatus for notifying a LSP, the downstream LSR detecting the link failure on the work LSP sends a SF message on the direction of the work LSP, so that the upstream LSR detecting the link failure on the work LSP receives the SF message and sends the packet via the protection LSP according to the SF message.

19 Claims, 22 Drawing Sheets

(56) References Cited

U.S. PATENT DOCUMENTS

| | | | | |
|---|---|---|---|---|
| 8,902,766 | B2* | 12/2014 | Kini | H04L 45/22 370/252 |
| 8,982,691 | B2* | 3/2015 | Jain | H04L 45/22 370/221 |
| 2004/0114595 | A1* | 6/2004 | Doukai | 370/389 |
| 2007/0091796 | A1* | 4/2007 | Filsfils et al. | 370/228 |
| 2010/0238788 | A1* | 9/2010 | Boutros et al. | 370/216 |
| 2011/0286324 | A1* | 11/2011 | Bellagamba et al. | 370/219 |
| 2012/0195186 | A1* | 8/2012 | Singh et al. | 370/217 |
| 2012/0207017 | A1* | 8/2012 | Ceccarelli et al. | 370/227 |
| 2012/0224471 | A1* | 9/2012 | Vinod et al. | 370/222 |

FOREIGN PATENT DOCUMENTS

| | | |
|---|---|---|
| CN | 102014006 | 4/2011 |
| CN | 102035712 | 4/2011 |
| CN | 102185773 | 9/2011 |
| CN | 102377601 | 3/2012 |
| EP | 2109261 | 10/2009 |

OTHER PUBLICATIONS

International Search Report and Written Opinion dated Jan. 17, 2013 issued on PCT Patent Application No. PCT/CN2012/082834 dated Oct. 12, 2012, The State Intellectual Property Office, the P.R. China.

* cited by examiner

| version number | reserved | protocol type=MR-PSC |
|---|---|---|
| source router identity ||||
| target router identity ||||
| message type | restoration mode | reserved |
Figure 9
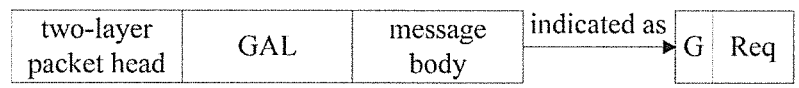
Figure 10
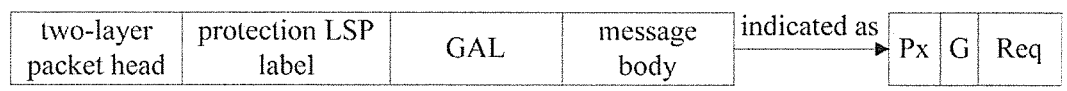
Figure 11

NOTIFYING OF A LSP FAILURE

CLAIM FOR PRIORITY

The present application is a national stage filing under 35 U.S.C. 371 of PCT application number PCT/CN2012/082834, having an international filing date of Oct. 12, 2012, which claims priority to Chinese patent application number 201110312364.X, filed on Oct. 14, 2011, the disclosures of which are hereby incorporated by reference in their entireties.

BACKGROUND

Multi-protocol Label Switching (MPLS) Transport Profile (TP) technologies are developed from Transport Multi-Protocol Label Switching (T-MPLS) technologies. MPLS TP technologies have been applied in various network topology structures because conventional MPLS technologies are compatible with each other and they satisfy the requirements of simple and high-efficiency transmission for packet services. The MPLS TP technologies are widely used in ring networks, which have network topology structures that can provide high reliability and self-healing ability. Packets are forwarded via a work Label Switched Path (LSP) in ring networks.

BRIEF DESCRIPTION OF THE DRAWINGS

Features of the present disclosure are illustrated by way of example and not limited in the following figure(s), in which like numerals indicate like elements, in which:

FIG. 9 is a schematic diagram illustrating a message format when a MR-PSC protocol is used according to an example of the present disclosure.

FIG. 10 is a schematic diagram illustrating a packet encapsulation format when a message shown in FIG. 9 is transmitted in a Section layer according to an example of the present disclosure.

FIG. 11 is a schematic diagram illustrating a packet encapsulation format when a message shown in FIG. 9 is transmitted via a protection LSP loop according to an example of the present disclosure.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Figure 1:
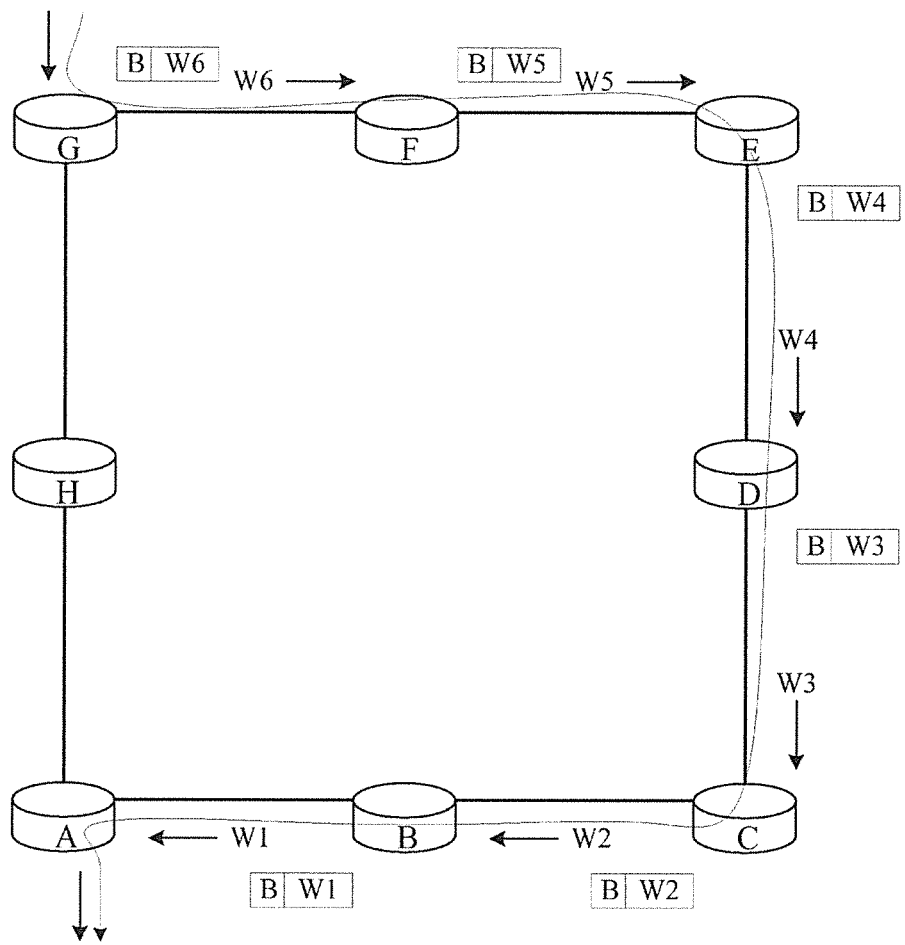
FIG. 1 is a schematic diagram illustrating an example of a conventional forwarding performed by a work LSP in a ring network.

FIG. 1 is a schematic diagram illustrating an example of a conventional forwarding performed by a work LSP in a ring network. In FIG. 1, a ring network including Label Switching Router (LSR) A~LSR H is taken as an example. A work LSP in a clockwise direction is configured in the ring network, in which LSR G is an ingress node and LSR A is an egress node of the work LSP. In addition to the ingress node LSR G, the work LSP includes LSR F~LSR A, and incoming working labels of LSR F~LSR A on the work LSP are W6~W1 respectively (as shown by the arrowheads on the outside of the ring network and on the clockwise direction).

A normal procedure for forwarding a packet via the work LSP when LSR A~LSR H in the ring network work normally includes the following operations.

LSR G receives a packet to be transmitted via the work LSP from a location external to the ring network. The packet is represented as a rectangular block and the letter B in the rectangular block indicates a stack bottom label of the packet. LSR G pushes W6 into the packet and sends the packet to LSR F. W6 is the incoming working label of LSR F, which is a downstream neighbor of LSR G on the work LSP.

The packet is transmitted through the work LSP via transit nodes LSRs F, E, D, C, and B. After receiving the packet via the work LSP, each LSR, as the transit node, swaps an incoming working label of the LSR carried by the packet for an incoming working label of a downstream neighbor of the LSR on the work LSP and forwards the packet. LSR D is taken as an example, in which, after receiving the packet carrying W4, which is the incoming working label of LSR D from LSR E, LSR D swaps W4 for W3, in which W3 is the incoming working label of LSR C, which is a downstream neighbor of LSR D on the work LSP, and LSR D forwards the packet to LSR C.

Finally, the packet arrives at the egress node LSR A and carries W1, which is the incoming working label of LSR A on the work LSP. LSR A pops W1 and sends the packet to a location external to the ring network.

When a failure occurs in the ring network, two conventional LSP protection switching modes based on the MPLS TP are provided for the ring network. A Wrapping mode is only applicable for a single link failure, and is not applicable for a multi-link failure or a node failure, which will be described with reference to FIGS. 2a to 2c.

Figure 2A:
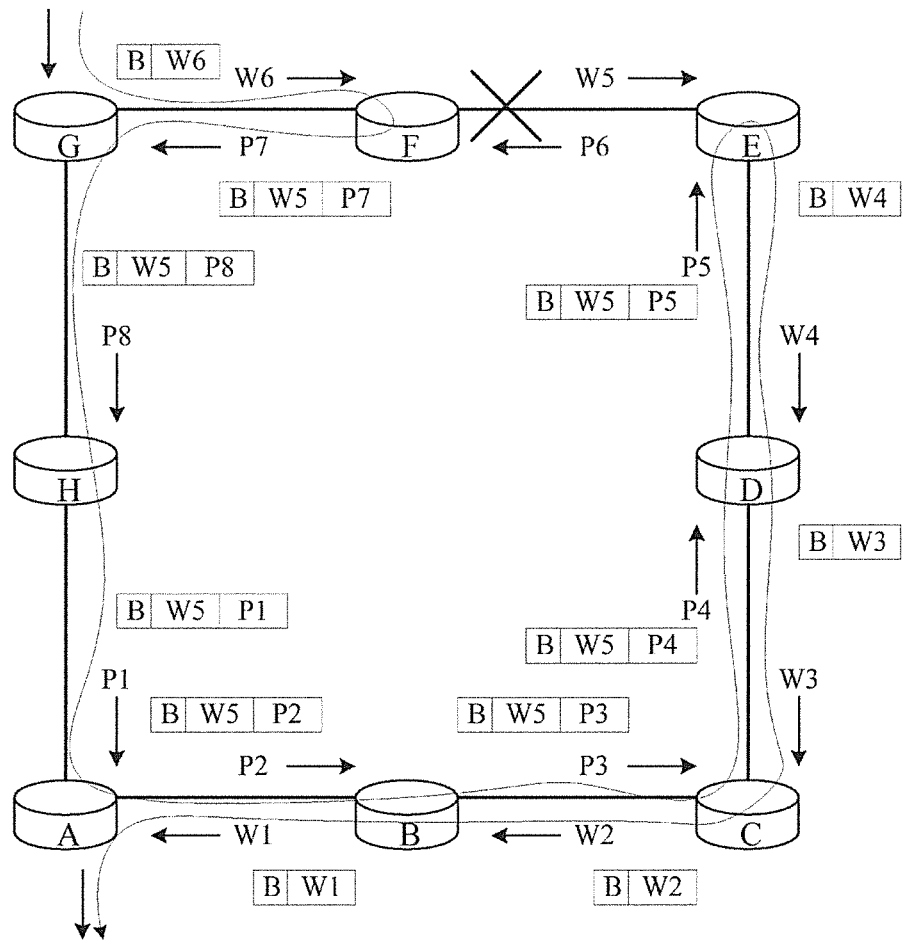
FIG. 2a is a schematic diagram illustrating a conventional protection switching implemented by using a Wrapping mode for a single link failure.
Figure 2B:
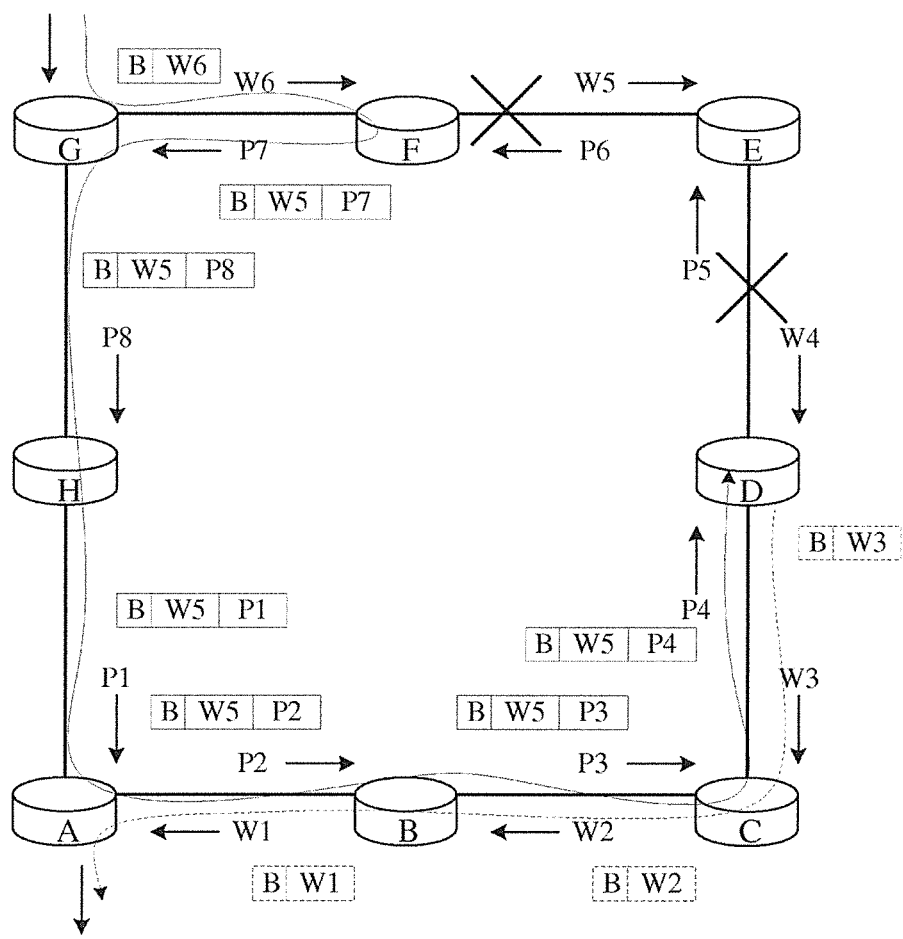
FIG. 2b is a schematic diagram illustrating a conventional protection switching implemented by using a Wrapping mode for a multi-link failure.
Figure 2C:
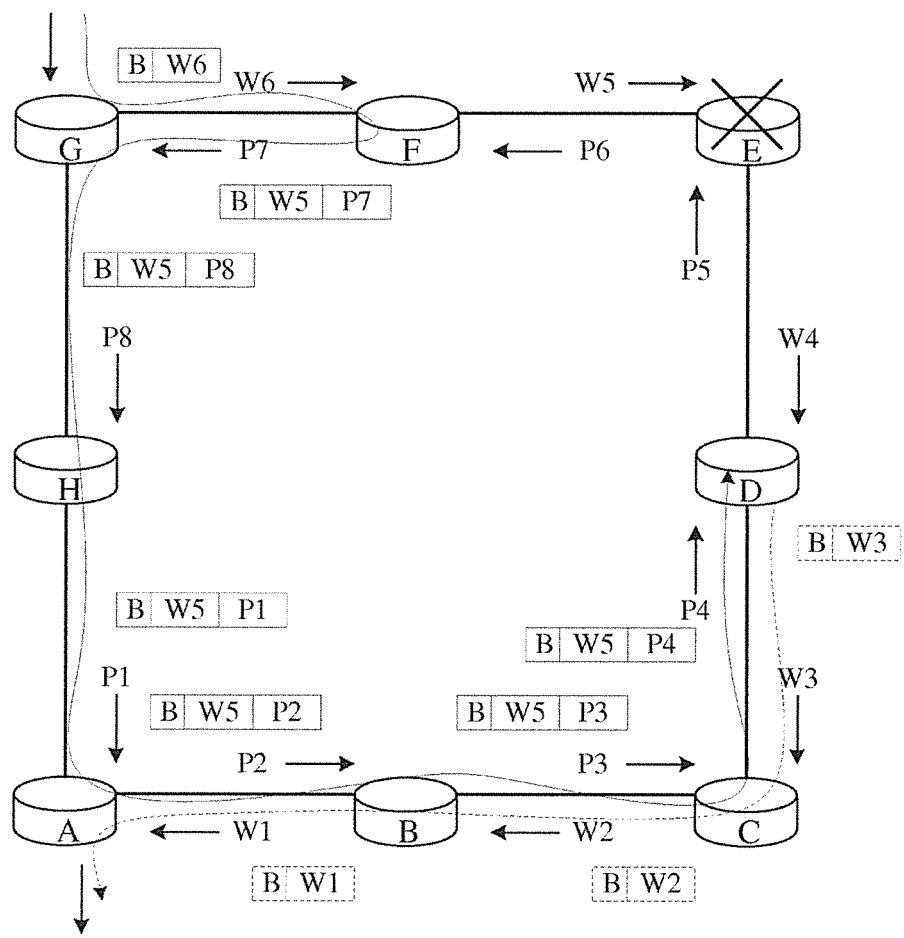
FIG. 2c is a schematic diagram illustrating a conventional protection switching implemented by using a Wrapping mode for a node failure.

In FIGS. 2a to 2c, the ring network shown in FIG. 1 is taken as an example, the work LSP, which flows in the clockwise direction, is also taken as an example, and LSR G is the ingress node and LSR A is the egress node. A protection LSP loop having an opposite direction is also configured in the ring network. The protection LSP loop having the opposite direction includes LSR A~LSR H, and incoming protection labels of LSR A~LSR H on the protection LSP loop are P1~P8 respectively (as shown by the arrowheads on the inside of the ring network and flowing in the counter-clockwise direction).

It is supposed that a failure occurs on a link between LSR F and LSR E. FIG. 2a is schematic diagram illustrating a conventional protection switching implemented by using a Wrapping mode for a single link failure. The procedure of the protection switching includes the following operations.

After receiving a packet to be transmitted via the work LSP from a location external to the ring network, LSR G pushes W6 into the packet and sends the packet to LSR F. W6 is the incoming working label of LSR F, which is a downstream neighbor of LSR G.

After receiving the packet carrying W6, LSR F swaps W6 for W5. Because the failure occurs on the link between LSR F and LSR E, which is the downstream neighbor of LSR F, the packet carrying W5 can only be forwarded via the protection LSP loop. Thus, LSR F needs to push P7 into an outer layer of W5. P7 is the incoming protection label of LSR G, which is in the downstream direction of LSR F on the protection LSP loop, so that the label carried by the packet includes W5 (inner layer)+P7 (outer layer).

Then, the packet is transmitted through the protection LSP loop via LSRs G~E. After receiving the packet, each of the LSRs from LSR G to LSR E swaps an incoming protection label of the LSR carried by the packet for an incoming protection label of a downstream neighbor of the LSR on the protection LSP loop, and no processing is performed for W5 in the inner layer.

After receiving the packet carrying P5, which is the incoming protection label of LSR E on the protection LSP loop, and because the failure occurs on the link between LSR E and LSR F which is the downstream neighbor of LSR E on the protection LSP loop, the transmission of the packet via the protection LSP loop is terminated. In addition, P5 carried in the outer layer of the packet is popped, W5 carried in the inner layer is exposed, and the packet is forwarded via the work LSP. Because W5 is the incoming working label of LSR E on the work LSP, LSR E swaps W5 for W4, in which W4 is the incoming working label of LSR D, which is a downstream neighbor of LSR E on the work LSP.

Then, the packet is transmitted through the work LSP via LSR D, C, B, and A. LSR A pops W1, and sends the packet to a location external to the ring network. The procedure of transmitting the packet from LSR D to LSR A is the same as the procedure of transmitting the packet from LSR D to LSR A when each LSR works normally as shown in FIG. 1.

FIG. 2b is schematic diagram illustrating an example in which a failure occurs on a link between LSR F and LSR E and a link between LSR E and LSR D. It can be seen that conventional protection switching implemented using a Wrapping mode does not work when there is a multi-link failure. The protection switching procedure in FIG. 2b includes the following operations.

After receiving a packet to be transmitted via the work LSP from a location external to the ring network, LSR G pushes W6 into the packet and sends the packet to LSR F. W6 is the incoming working label of LSR F, which is a downstream neighbor of LSR G.

After receiving the packet carrying W6, according to the same principle of the situation shown in FIG. 2a, LSR F swaps W6 for W5, pushes the outer layer label P7, and forwards the packet via the protection LSP loop.

The packet is transmitted via the protection LSP loop via LSRs G~D. the procedure of forwarding the packet via the protection LSP loop is the same as the procedure of forwarding the packet via the protection LSP loop from LSRs G~D as shown in FIG. 2a.

After the above procedure, the packet received by LSR D carries P4, which is the incoming protection label of LSR D on the protection LSP loop. Because the failure occurs on the link between LSR D and LSR E, which is the downstream neighbor of the LSR D on the protection LSP loop, the forwarding of the packet on the protection LSP loop is terminated. LSR D pops P4 carried by the outer layer in the packet, and W5 in the inner layer is exposed. However, because W5 is not the incoming working label of LSR D on the work LSP, LSR D cannot swap W5 for W3, which is the incoming working label on the work LSP of LSR C in the downstream of LSR D.

Thus, the packet cannot be forwarded through the work LSP via LSR C and LSR B, and cannot finally arrive at the egress node LSR A according to the procedure defined in the Wrapping mode (the procedure cannot be performed when it comes to the part shown by the dashed lines).

If LSR E is failed, as shown in FIG. 2c, which is a schematic diagram illustrating a conventional protection switching implemented by using a Wrapping mode for a node failure, the protection switching procedure is the same as that shown in FIG. 2b. In addition, the procedure defined in the Wrapping mode cannot be implemented either. Similarly, when multiple nodes are failed, the procedure defined in the Wrapping mode cannot be implemented.

As can be seen, when LSR F performs the LSP protection switching, the inner layer label of the packet is not swapped for the incoming working label on the work LSP of LSR D, and thus, after receiving the packet via the protection LSP loop, LSR D cannot forward the packet via the work LSP according to the inner layer work label carried in the packet. Hence, the conventional LSP switching solutions of the Wrapping mode cannot implement the LSP protection switching when multiple links are failed, when a single node is failed, and when multiple nodes are failed.

Figure 3:
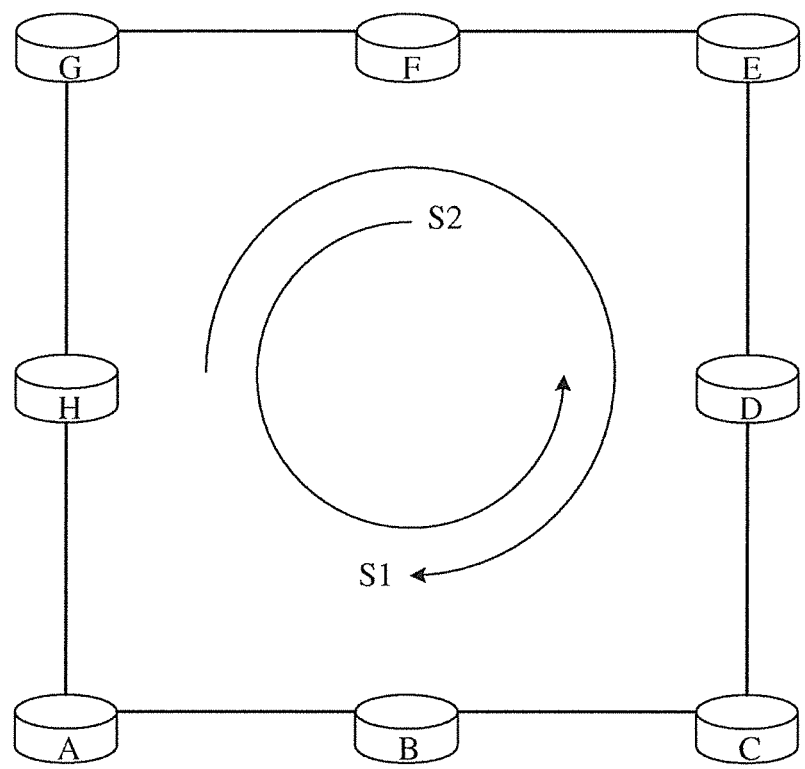
FIG. 3 is a schematic diagram illustrating direction definitions in a ring network according to an example of the present disclosure.

FIG. 3 is a schematic diagram illustrating direction definitions in a ring network according to an example of the present disclosure. As shown in FIG. 3, a ring network including LSR A~LSR H, and the clockwise direction is defined as a first direction S1 and the counter-clockwise direction is defined as a second direction S2.

There may be multiple work LSPs with different ingress nodes and egress nodes on the first direction S1, and all of the work LSPs use the same protection LSP loop on the second direction S2 together. In addition, or alternatively, there may be multiple work LSPs with different ingress nodes and egress nodes on the second direction S2, and all of the work LSPs use the same protection LSP loop on the first direction S1 together. That is, multiple work LSPs with different ingress nodes and egress nodes in the same direction may use the same protection LSP loop in the opposite direction together.

Accordingly, the ring network port, which is the incoming port of each LSR of LSR A~LSR H on the first direction S1 is taken as the outgoing port of the LSR on the second direction S2. The ring network port, which is the outgoing port of each LSR of LSR A~LSR H on the first direction S1 is taken as the incoming port of the LSR on the second direction S2.

The method for notifying of a failure, in which multiple work LSPs with different ingress nodes or egress nodes in the first direction use the same protection LSP loop in the second direction together, is described herein.

In practical applications, the failure notification may be implement by using control layer signaling, e.g., signaling of MPLS TP Ring Protection State Coordination (MR-PSC) protocols, which is an example only and the present disclosure is not limited thereto.

Figure 4:
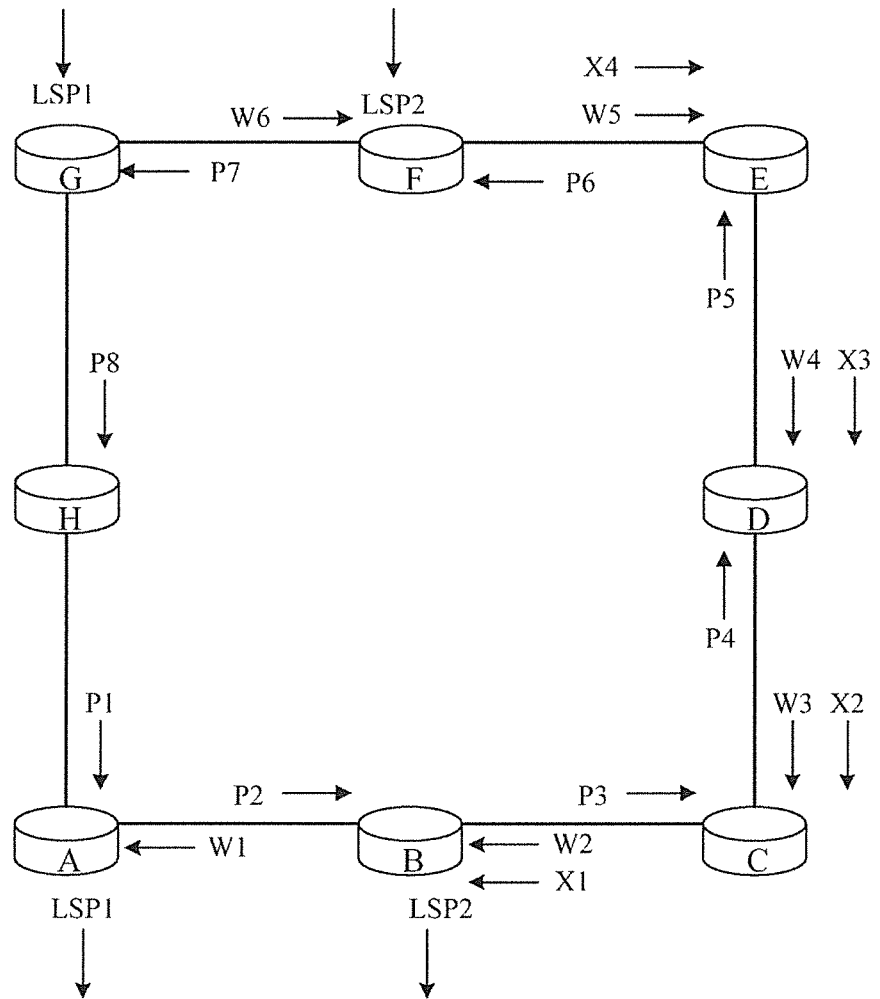
FIG. 4 is a schematic diagram illustrating a work LSP and a protection LSP loop configured in a ring network shown in FIG. 3 according to an example of the present disclosure.

FIG. 4 is a schematic diagram illustrating a work LSP and a protection LSP loop configured in a ring network shown in FIG. 3 according to an example of the present disclosure.

As shown in FIG. 4, on the first direction S1 of the ring network, there are a work LSP1 and a work LSP2, an ingress node and an egress node of the work LSP1 are LSR G and LSR A respectively, and an ingress node and an egress node of the work LSP2 are LSR F and LSR B respectively. In addition to the ingress node LSR G, the work LSP1 includes LSR F~LSR A in the first direction, and incoming working labels of LSR F~LSR A on the work LSP1 are W6~W1 respectively. In addition to the ingress node LSR F, the work LSP2 includes LSR E~LSR B in the first direction, and incoming working labels of LSR E~LSR B on the work LSP2 are X4~X1 respectively. A close protection LSP loop is configured in the second direction opposite to the first direction, and the protection LSP loop with the opposite direction of the work LSP1 and LSP2 includes LSR A~LSR H, and incoming protection labels of LSR A~LSR H on the protection LSP loop are P1~P8 respectively.

In the ring network shown in FIG. 4, if all of the LSRs work normally, the procedure of forwarding the packet is the same as the conventional mode. When the LSR or link included in the work LSP1 or LSP2 is failed, the LSR detecting the failure notifies another LSP that the LSP failure has occurred so that protection switching can be performed for the work LSP. This is will now be described in more detail with reference to FIGS. 5a to 5c.

Figure 5A:
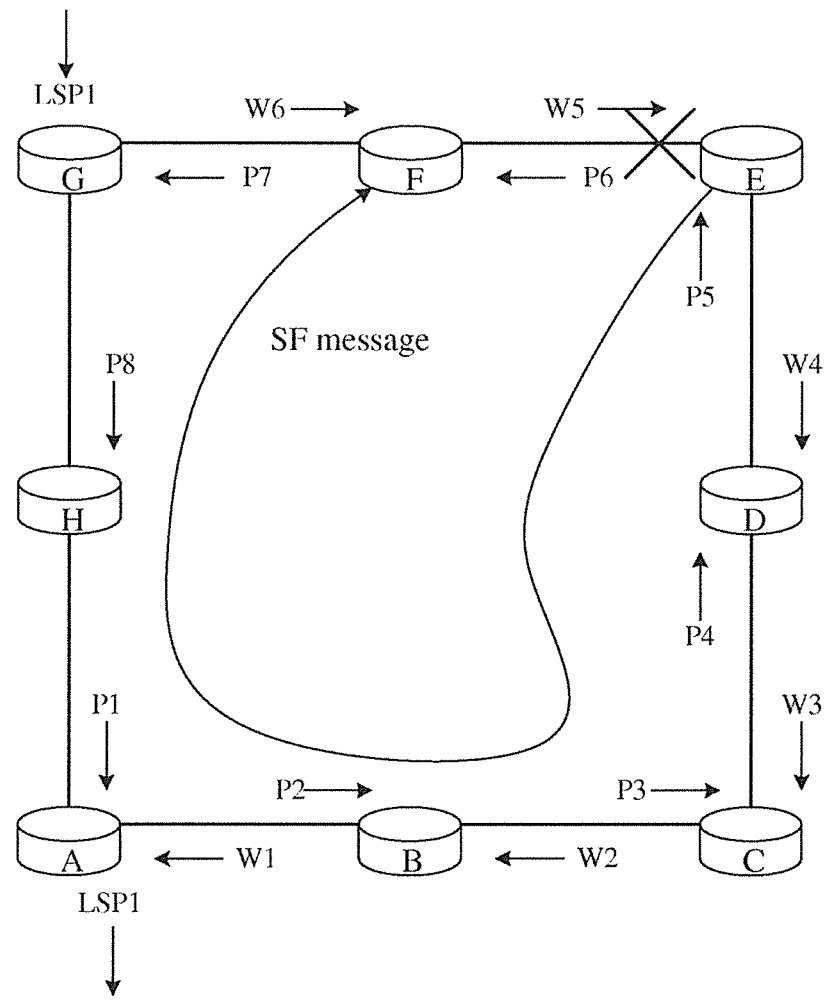
FIG. 5a is schematic diagram illustrating a failure notification when a single link failure occurs in a ring network shown in FIG. 4 according to an example of the present disclosure.
Figure 5B:
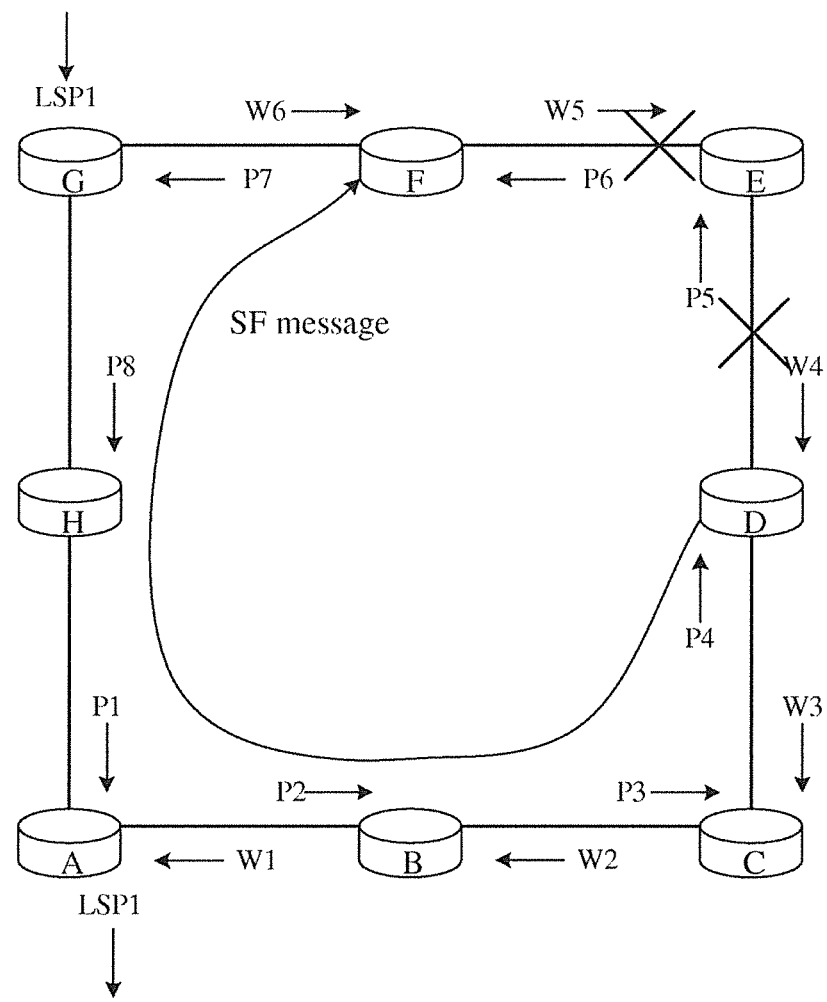
FIG. 5b is schematic diagram illustrating a failure notification when a multi-link failure occurs in a ring network shown in FIG. 4 according to an example of the present disclosure.
Figure 5C:
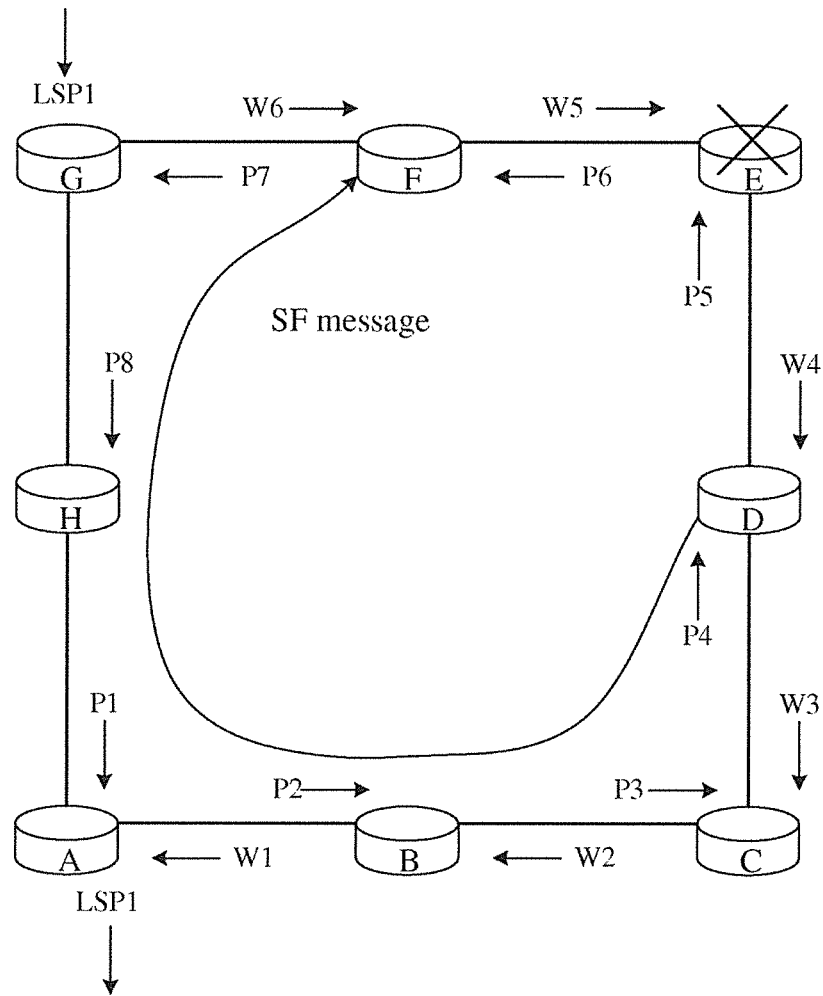
FIG. 5c is schematic diagram illustrating a failure notification when a node failure occurs in a ring network shown in FIG. 4 according to an example of the present disclosure.

In FIGS. 5a to 5c, on the first direction S1, only the incoming working label of each LSR on the work LSP1 is shown. Each of the LSRs from LSR A to LSR H needs to detect whether a link between the LSR and a neighbor LSR is failed. If a link between the LSR and a upstream neighbor on the first direction S1 is failed (because the link is failed or the upstream neighbor is failed), the LSR needs to send a signal failure (SF) message carrying an identity of the LSR along the first direction, so that the SF message can arrive at another LSR detecting that the link between the LSR and a downstream neighbor on the first direction S1 is failed.

FIG. 5a is schematic diagram illustrating a failure notification when a single link failure occurs in a ring network shown in FIG. 4. It is supposed that the link between LSR F and LSR E is failed, LSR E detects that the link between LSR E and an upstream neighbor LSR F on the first direction S1 is failed, and thus sends a SF message carrying the identity of LSR E along the first direction S1. The SF is transmitted via LSR D, C, B, A, H, G and finally to LSR F. LSR F detects that the link between LSR F and a downstream neighbor LSR E in the first direction S1 is failed and receives the SF message sent by LSR E. Thus LSR F determines that LSR E is the device that detected the downstream failure (i.e. LSR E is the "downstream failure detector") according to the identity of LSR E carried in the SF message, so that packets transmitted via the work LSP1 and the work LSP2 along the first direction S1 are transmitted via the protection LSP loop along the second direction S2 (which will be described in FIG. 6b).

FIG. 5b is schematic diagram illustrating a failure notification when a multi-link failure occurs in a ring network shown in FIG. 4. It is supposed that the link between LSR F and LSR E and the link between LSR E and LSR D are failed, LSR D detects that the link between LSR D and an upstream neighbor LSR E on the first direction S1 is failed, and thus sends a SF message carrying the identity of LSR D along the first direction S1. The SF is transmitted via LSR C, B, A, H, G and finally to LSR F. LSR F detects that the link between LSR F and a downstream neighbor LSR E in the first direction S1 is failed and receives the SF message sent by LSR D. Thus, LSR F determines LSR D as the downstream failure detector according to the identity of LSR D carried in the SF message, so that packets transmitted via the work LSP1 and the work LSP2 along the first direction S1 are transmitted via the protection LSP loop along the second direction S2 (which will be described in FIG. 6b).

FIG. 5c is a schematic diagram illustrating a failure notification when a node failure occurs in a ring network shown in FIG. 4. It is supposed that LSR E is failed, LSR D detects that the link between LSR D and an upstream neighbor LSR E in the first direction S1 is failed, and thus sends a SF message carrying the identity of LSR D in the first direction S1. The SF is transmitted via LSR C, B, A, H, G and finally to LSR F. LSR F detects that the link between LSR F and a downstream neighbor LSR E in the first direction S1 is failed and receives the SF message sent by LSR D, thus LSR F determines LSR D as the downstream failure detector according to the identity of LSR D carried in the SF message, so that packets transmitted via the works LSP1 and LSP2 along the first direction S1 are transmitted via the protection LSP loop along the second direction S2 (which will be described with respect to FIG. 6b).

In should be noted that, the SF message in FIGS. 5a to 5c may be sent periodically, e.g., may be sent every 3.3 seconds.

The method for notifying of the failure shown in FIGS. 5a to 5c may be applied to protection switching of the work LSP, and will be described hereinafter.

Figure 6A:
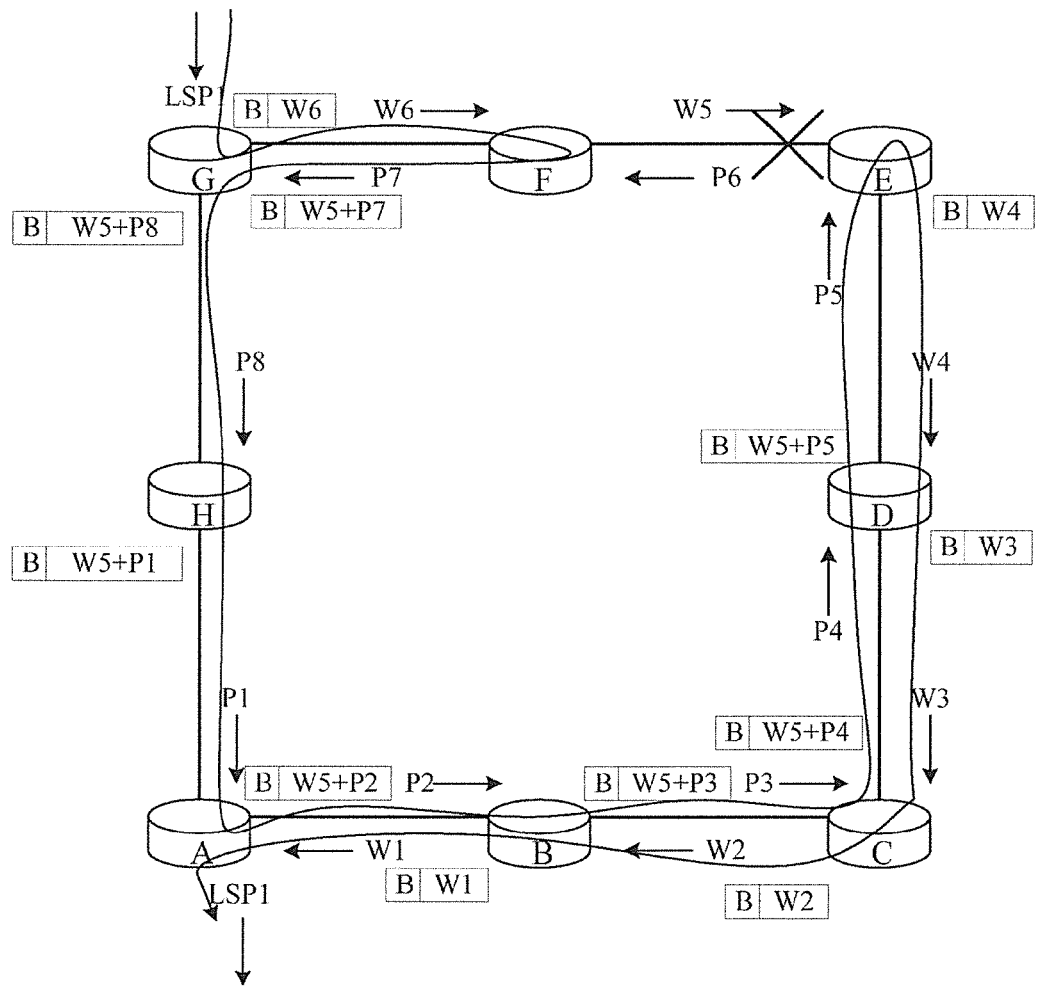
FIG. 6a is a schematic diagram illustrating protection switching based on a single link failure shown in FIG. 5a according to an example of the present disclosure.
Figure 6B:
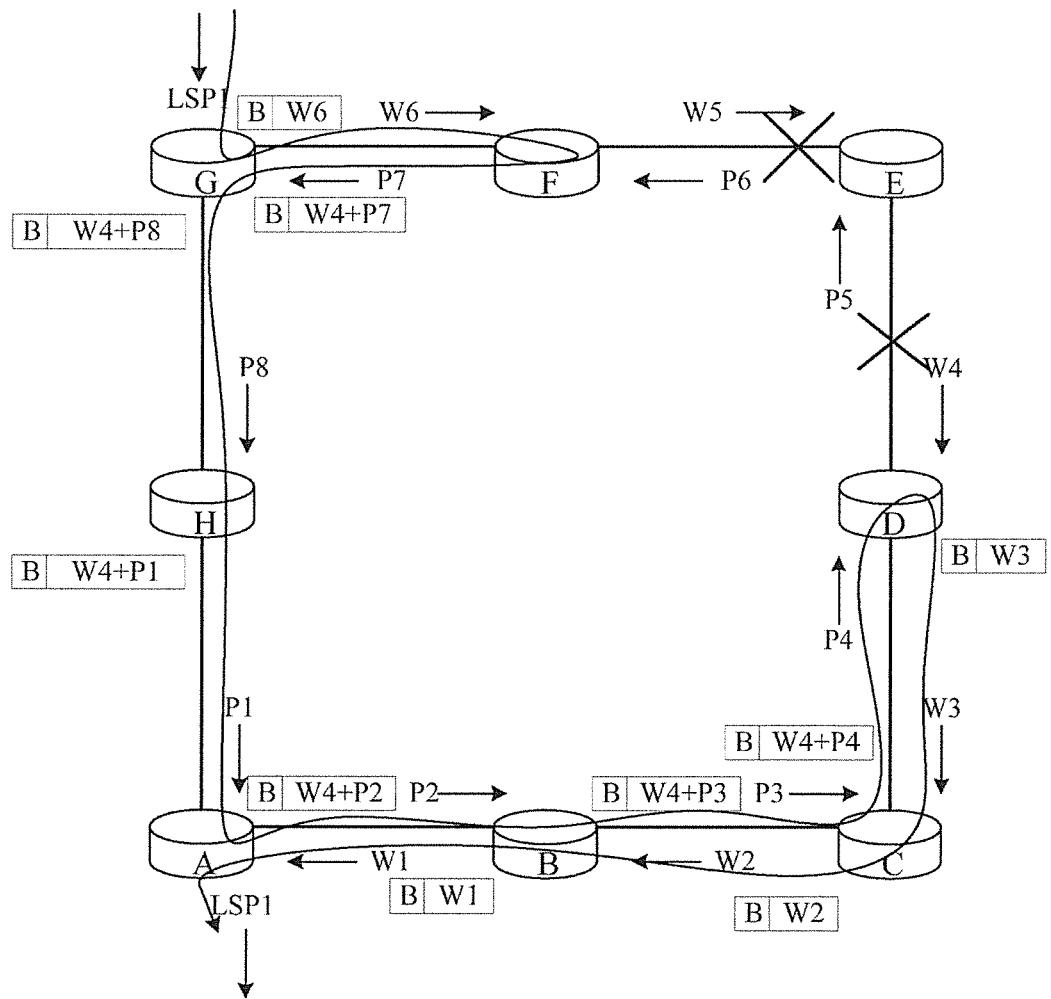
FIG. 6b is a schematic diagram illustrating protection switching based on a multi-link failure shown in FIG. 5b according to an example of the present disclosure.
Figure 6C:
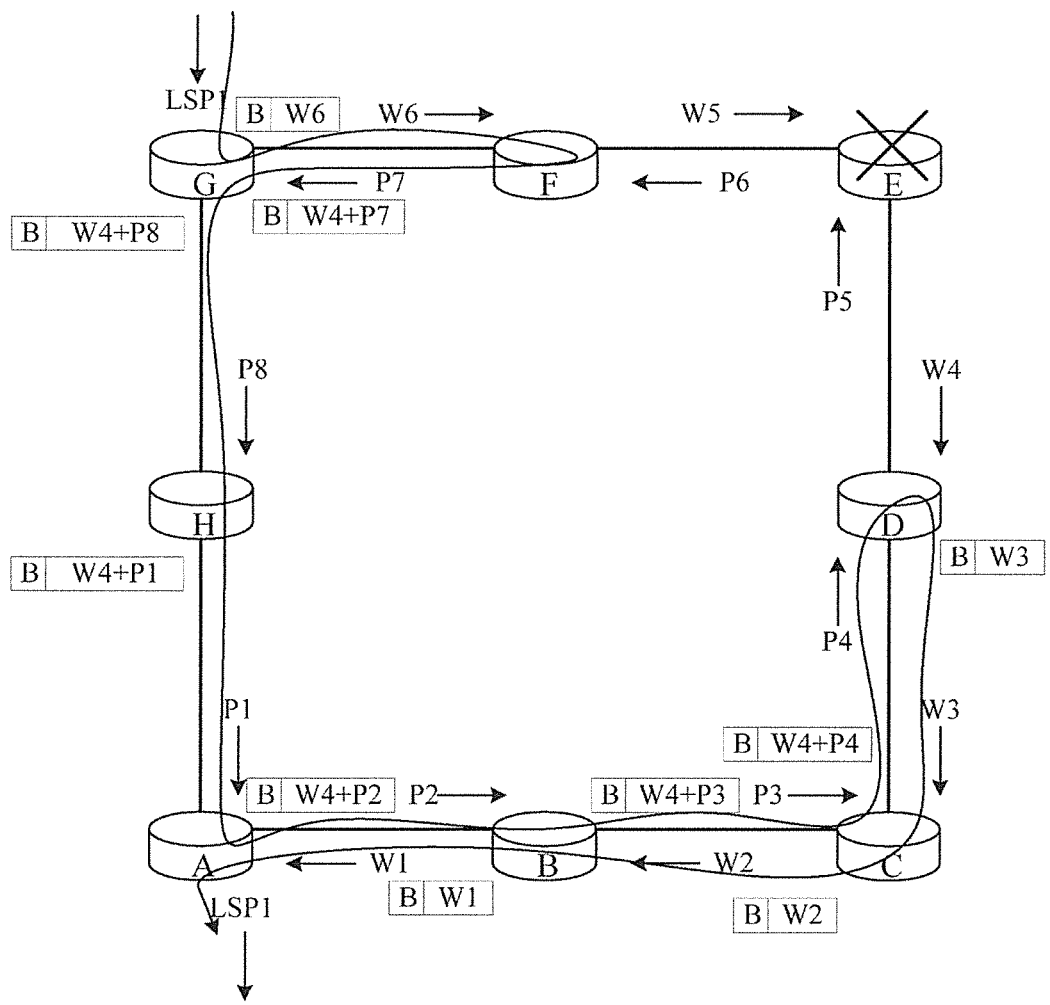
FIG. 6c is a schematic diagram illustrating protection switching based on a node failure shown in FIG. 5c according to an example of the present disclosure.

In order to use the method for notifying of the failure shown in FIGS. 5a to 5c for protection switching of the work LSP, each LSR in FIGS. 6a to 6c may pre-record incoming working labels of all downstream neighbors on each work LSP including the LSR. Taking LSR E as an example, LSR E pre-records the incoming working labels of downstream neighbor LSR D, C, B, A on the work LSP1, and pre-records the incoming working labels of downstream neighbor LSR D, C, B on the work LSP2.

FIG. 6a is a schematic diagram illustrating protection switching based on a single link failure shown in FIG. 5a. It is supposed that LSR F has received the SF message sent by LSR E and has recorded LSR E as the downstream failure detector, and the procedure of the protection switching on the work LSP1 includes the following operations.

The ingress node LSR G receives a packet to be transmitted via the work LSP1 from a location external to the ring network, pushes W6 into the packet and sends the packet to LSR F. W6 is the incoming working label of LSR F on the work LSP1 and LSR F is a downstream neighbor of LSR G.

As the transit node of the work LSP, LSR F identifies W6 carried by the packet. Because the failure occurs on the link between LSR F and LSR E, the link between LSR F and LSR E is failed and the packet needs to be transmitted via the protection LSP loop. Hence, LSR F determines the incoming working label of the downstream failure detector on the work LSP1 according to the recorded incoming working labels of other LSRs on the work LSP1, swaps W6 for W5, which is the incoming working label of LSR E on the work LSP1, and pushes P7 into an outer layer of W5. P7 is the incoming protection label of LSR G, which is in the downstream direction of LSR F on the second direction S2, so that the label carried by the packet includes W5 (inner layer)+P7 (outer layer).

In the protection LSP loop, after receiving the packet forwarded via the protection LSP loop, each of the LSRs from LSR G to LSR E swaps the incoming protection label of the LSR carried by the packet for an incoming protection label of a downstream neighbor of the LSR in the protection LSP loop, and no processing is performed for W5 in the inner layer.

After the above procedure, the packet received by LSR E carries W5 (inner layer)+P7 (outer layer). Because the failure occurs on the link between LSR E and LSR F, LSR E pops P5 carried by the outer layer in the packet, and W5 in the inner layer is exposed. Because W5 is the incoming working label of LSR E on the work LSP1, LSR E swaps W5 carried by the packet for W4 and sends the packet to LSR D. W4 is the incoming working label of LSR D, which is the downstream neighbor of LSR E on the work LSP1.

After receiving the packet via the work LSP1, each of the LSRs from LSR D to LSR B swaps the incoming working label of the LSR on the work LSP1 carried by the packet for an incoming working label of a downstream neighbor of the LSR on the work LSP1.

Finally, the packet received by LSR A carries W1, which is the incoming working label of LSR A on the work LSP1, and LSR A, as the egress node, pops W1 carried by the packet, and sends the packet to a location external to the ring network.

In FIG. 6a, only the procedure of protection switching on the work LSP1 is provided. If the work LSP2 shown in FIG. 4 is in FIG. 6a, the procedure of protection switching on the work LSP2 is basically the same as the procedure of protection switching on the work LSP1, and the differences include that: LSR F is the ingress node of the work LSP2, and detects that the failure occurs on the link between LSR F and LSR E, which is the downstream neighbor in the first direction. Hence, after receiving the packet to be forwarded via the work LSP2 from a location external to the ring network, LSR F directly pushes W5, which is the incoming working label of LSR E in the work LSP1, pushes P7 into an outer layer of W5, and sends the packet to LSR G. P7 is the incoming protection label of LSR G, which is in the downstream direction of LSR F on the second direction S2, so that the label carried by the packet includes W5 (inner layer)+P7 (outer layer). Hence, the packet is forwarded via the protection LSP loop at the ingress node.

If other work LSPs on the first direction S1 including LSR F and LSR E are in FIG. 6a, the principle of the protection switching is the same as that of the work LSP1 and LSP2.

FIG. 6b is schematic diagram illustrating protection switching based on a multi-link failure shown in FIG. 5b. It is supposed that LSR F has received the SF message sent by LSR D and has recorded LSR D as the downstream failure detector, and the procedure of the protection switching on the work LSP1 includes the following operations.

The ingress node LSR G receives a packet to be transmitted via the work LSP1 from a location external to the ring network, pushes W6 into the packet, and sends the packet to LSR F. W6 is the incoming working label of LSR F on the work LSP 1 and LSR F is a downstream neighbor of LSR G.

Similarly with the procedure shown in FIG. 6a, LSR F forwards the packet via the protection LSP loop and makes the packet forwarded via the protection LSP loop along the second direction S2 carry the label including W5 (inner layer)+P7 (outer layer). In addition, after the label switching performed for the outer layer on the protection LSP loop, the packet received by LSR D carries W5 (inner layer)+P4 (outer layer). Because the failure occurs on the link between LSR D and LSR E, which is the upstream neighbor of LSR D on the first direction, LSR E pops P4 carried by the outer layer in the packet, and W4 in the inner layer is exposed. Because W4 is the incoming working label of LSR D on the work LSP1, LSR D swaps W4 carried by the packet for W3. W3 is the incoming working label of LSR C, which is the downstream neighbor of LSR E on the work LSP1.

Finally, the packet received by LSR A carries W1, which is the incoming working label of LSR A on the work LSP1, and LSR A, as the egress node, pops W1 carried by the packet, and sends the packet to a location external to the ring network.

In FIG. 6b, only the procedure of the protection switching on the work LSP1 is provided. If the work LSP2 shown in FIG. 4 is in FIG. 6b, the procedure of protection switching on the work LSP2 is basically the same as the procedure of protection switching on the work LSP1, and the differences include that: LSR F is the ingress node of the work LSP2, and detects the failure occurs on the link between LSR F and LSR D, which is the downstream neighbor in the first direction. Hence, after receiving the packet to be forwarded via the work LSP2 from a location external to the ring network, LSR F directly pushes W4, which is the incoming working label of LSR D on the work LSP2, pushes P7 into an outer layer of W4, and sends the packet to LSR G. P7 is the incoming protection label of LSR G, which is in the downstream direction of LSR F on the second direction S2, so that the label carried by the packet includes W5 (inner layer)+P7 (outer layer). Hence, the packet is forwarded via the protection LSP loop at the ingress node.

If other work LSPs on the first direction S1, including LSR F, LSR E, and LSR D are in FIG. 6b, the principle of protection switching is the same as that of the work LSP1 and LSP2.

FIG. 6c is a schematic diagram illustrating protection switching based on a node failure shown in FIG. 5c. It is supposed that LSR F has received the SF message sent by LSR D and has recorded LSR D as the downstream failure detector, and the procedure of the protection switching on the work LSP1 is the same as the procedure shown in FIG. 6b, and will not be described herein. The principle of the protection switching based on multi-node failure is the same as that based on the single node failure, and will not be described herein.

As can be seen, the method for notifying of the failure can be used for the protection switching of the work LSP, so as to solve the problems of the Wrapping mode in which the protection switching based on multi-link failure, single node failure, and multi-node failure cannot be implemented.

As described above, when the failure occurs and the LSR detects the link between the LSR and the upstream neighbor on the first direction S1 is failed, the LSR sends the SF message carrying the identifier of the LSR, so that another LSR detecting the link between the another LSR and the downstream neighbor on the first direction S1 is failed can record the downstream failure detector according to the received SF message and perform the protection switching for the work LSP according to the incoming working label of the downstream failure detector on the work LSP of the first direction S1.

When the failure of the work LSP on the first direction S1 is restored, the packet may be transmitted via the work LSP directly or via the protection LSP loop continually. Correspondingly, a restoration mode (R) is related. When the restoration mode is an unrecoverable mode, if the failure is restored, the packet is transmitted via the protection LSP loop, i.e. the path determined after the protection switching. When the restoration mode is a recoverable mode, if the failure is restoration, the packet is transmitted via the work LSP directly. The LSRs in the ring network should have the same restoration mode. Hence, when the failure occurs and the LSR detects the link between the LSR and the upstream neighbor on the first direction S1 is failed, besides the identifier of the LSR, the restoration mode of the LSR is also carried in the SF message sent by the LSR. The another LSR detecting the link between the another LSR and the downstream neighbor on the first direction S1 is failed can determine whether the restoration mode in the SF message is the same as that of the another LSR, if the restoration mode in the SF message is different from that of the another LSR, alarm information, i.e. system alarm information will be reported; otherwise, the failure notification is performed continually.

In addition, in order to obtain the failure restoration state of the work LSP, each LSR also needs to perform failure restoration detection after detecting the failure. The single link failure, multi-link failure, and node failure (including single node failure and multi-node failure) relates to the same procedure of failure restoration detection. Therefore, based on FIGS. 7a to 7d, the procedure of failure restoration detection performed for the single link failure is described as an example.

Figure 7A:
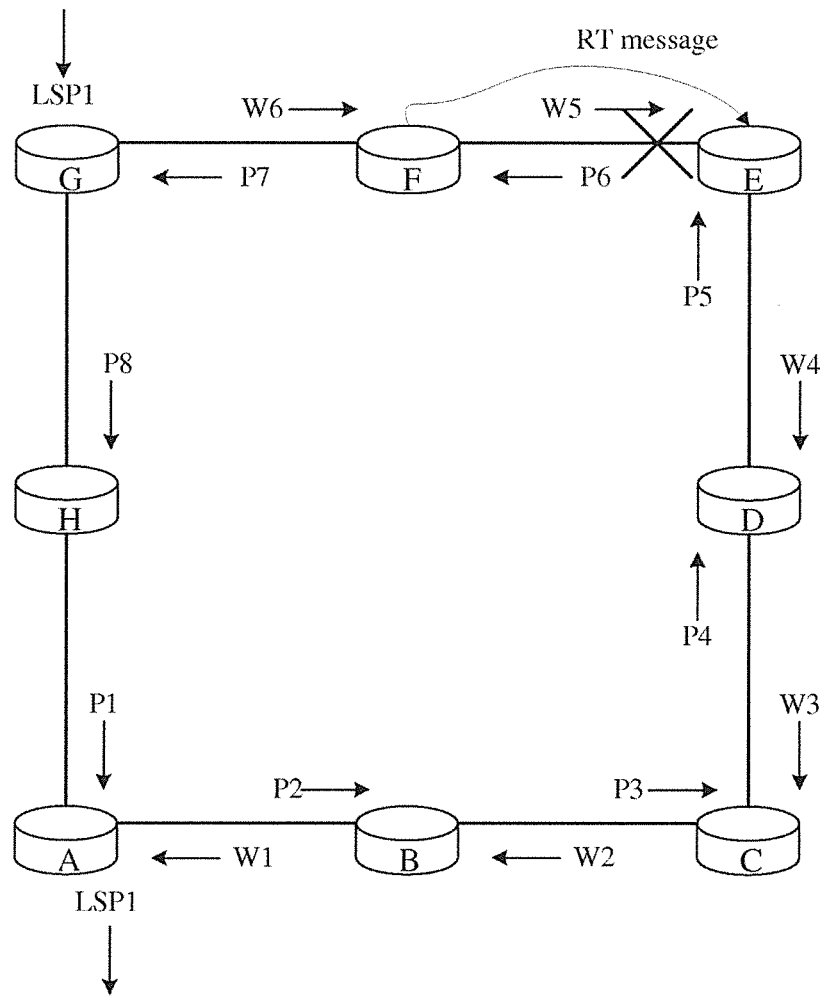
FIG. 7a is a schematic diagram illustrating a failure restoration test based on a single link failure shown in FIG. 5a according to an example of the present disclosure.

FIG. 7a is a schematic diagram illustrating a failure restoration test based on a single link failure shown in FIG. 5a. It is supposed that LSR F has received the SF message sent by LSR E along the first direction S1 and has recorded LSR E as the downstream failure detector. LSR F sends a restore test (RT) message carrying the identifier of LSR F to the recorded downstream failure detector along the first direction. If LSR E receives the RT message sent by LSR F, it is determined that the link is restored, and LSR E stops sending the SF message. In addition, LSR E also needs to notify LSR F of the state of link restoration.

Figure 7B:
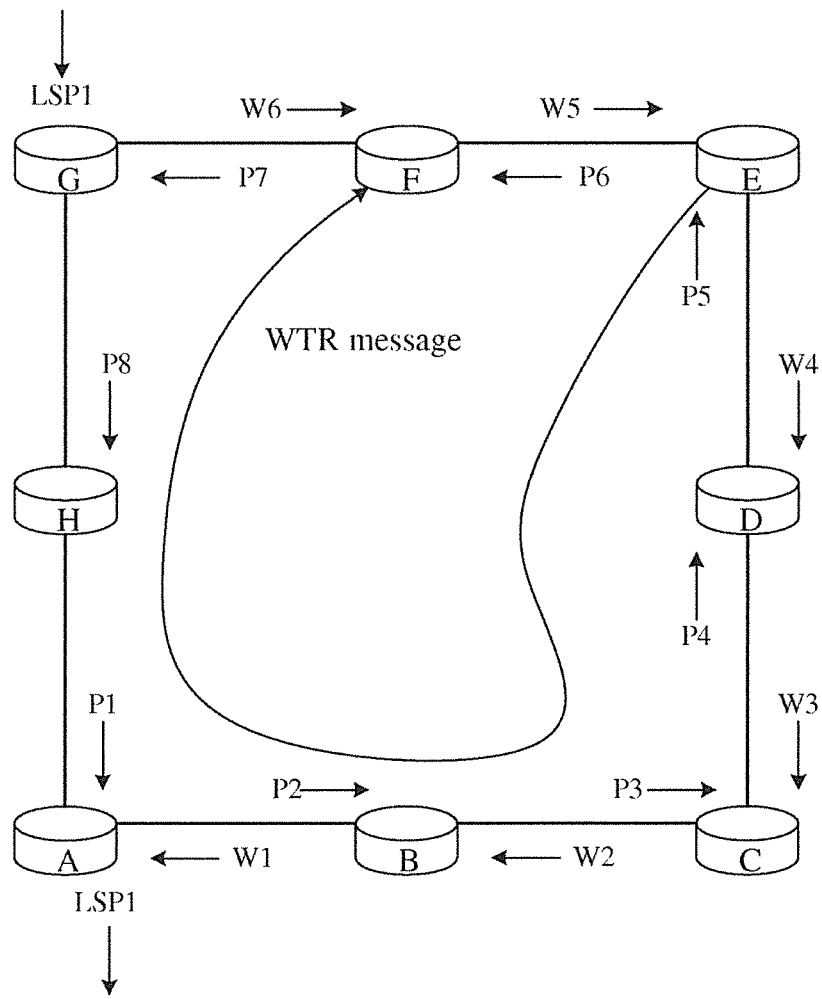
FIG. 7b is a schematic diagram illustrating a notification wait restoration based on a single link failure shown in FIG. 5a according to an example of the present disclosure.

FIG. 7b is a schematic diagram illustrating notification wait restoration based on a single link failure shown in FIG. 5a. It is supposed that LSR E has received the RT message sent by LSR F along the first direction S1 and thus determines that the link between LSR E and LSR F is restored. LSR E sends a wait to restore (WTR) message to LSR F along the first direction according to the identity of LSR F carried in the RT message. If LSR F receives the WTR message sent by LSR E, it is determined that the link is restored, and stops sending the RT message. In addition, LSR F also determines that the packet is to be forwarded via the protection LSP loop continually or determines that the packet is to be forwarded via the work LSP according to the restoration mode of LSR F, and notifies LSR E that the procedure of link restoration is finished.

Figure 7C:
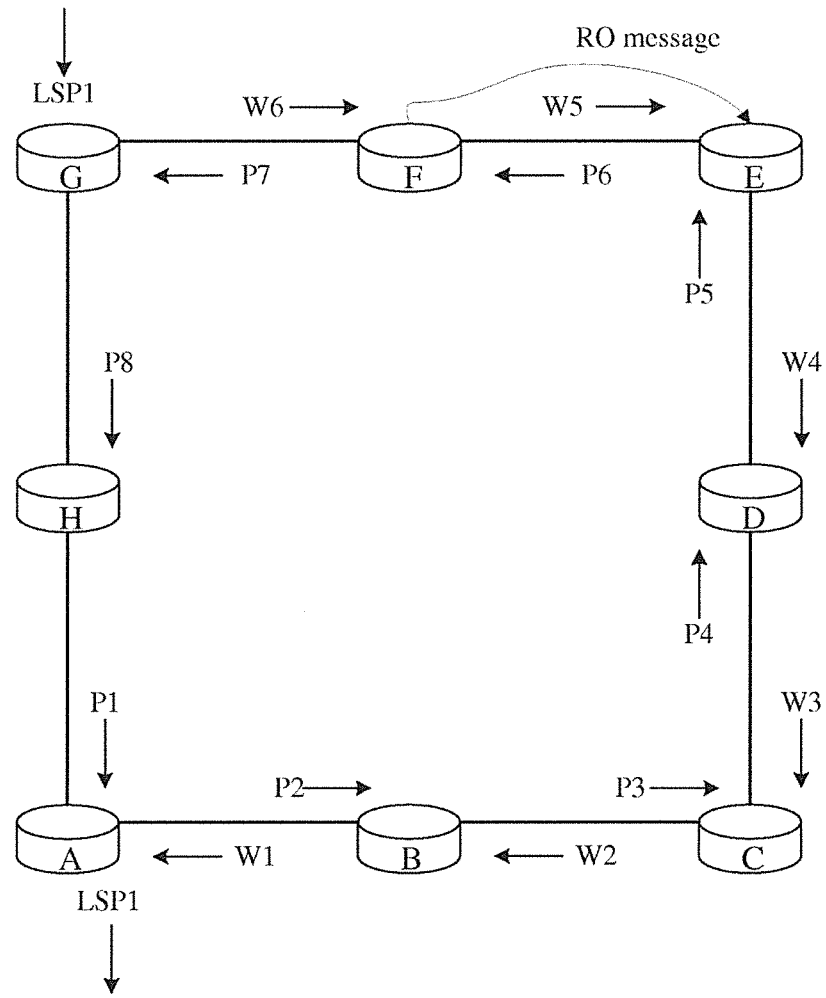
FIG. 7c is a schematic diagram illustrating the finish of a notification restoration procedure based on a single link failure shown in FIG. 5a according to an example of the present disclosure.

FIG. 7c is a schematic diagram illustrating the finish of a notification restoration procedure based on a single link failure shown in FIG. 5a. It is supposed that LSR F has received the WTR message sent by LSR E along the first direction and has determined that the packet is to be forwarded via the protection LSP loop continually or has determined that the packet is to be forwarded via the work LSP according to the restoration mode of LSR F. In addition, LSR F sends a restore over (RO) message to LSR E along the first direction to notify LSR E that the procedure of link restoration is finished. After LSR E receives the RO message sent by LSR F, it is determined that the procedure of link restoration is finished.

Figure 7D:
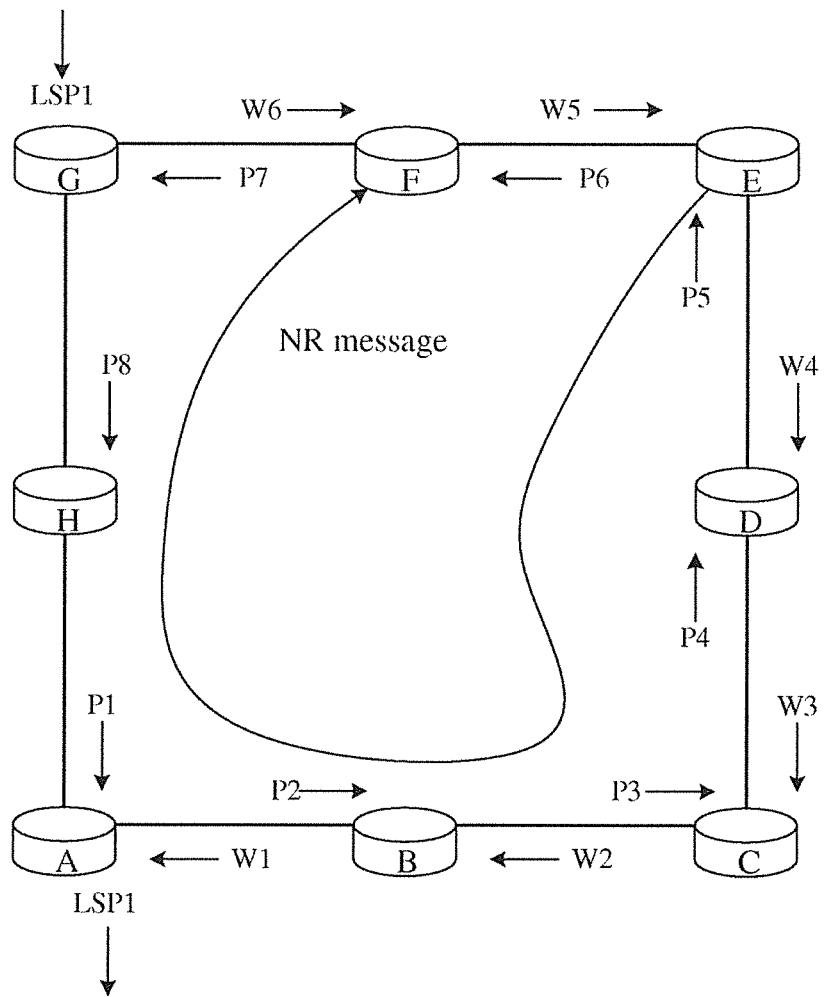
FIG. 7d is schematic diagram illustrating the finish of a restoration procedure based on a single link failure shown in FIG. 5a according to an example of the present disclosure.

FIG. 7d is a schematic diagram illustrating the finish of a restoration procedure based on a single link failure shown in FIG. 5a. It is supposed that LSR E has received the RO message sent by LSR F along the first direction S1. LSR E finishes the MR-PSC procedure after sending no request (NR) messages, and the number of the NR messages is pre-configured.

In the above descriptions, the work LSP is configured on the first direction S1 and the protection LSP loop is configured on the second direction S2, which are only taken as an example. In practical applications, other work LSPs may be configured on the second direction S2, and a protection LSP loop may be configured on the first direction S1 for all of the work LSPs configured on the second direction S2.

Figure 8:
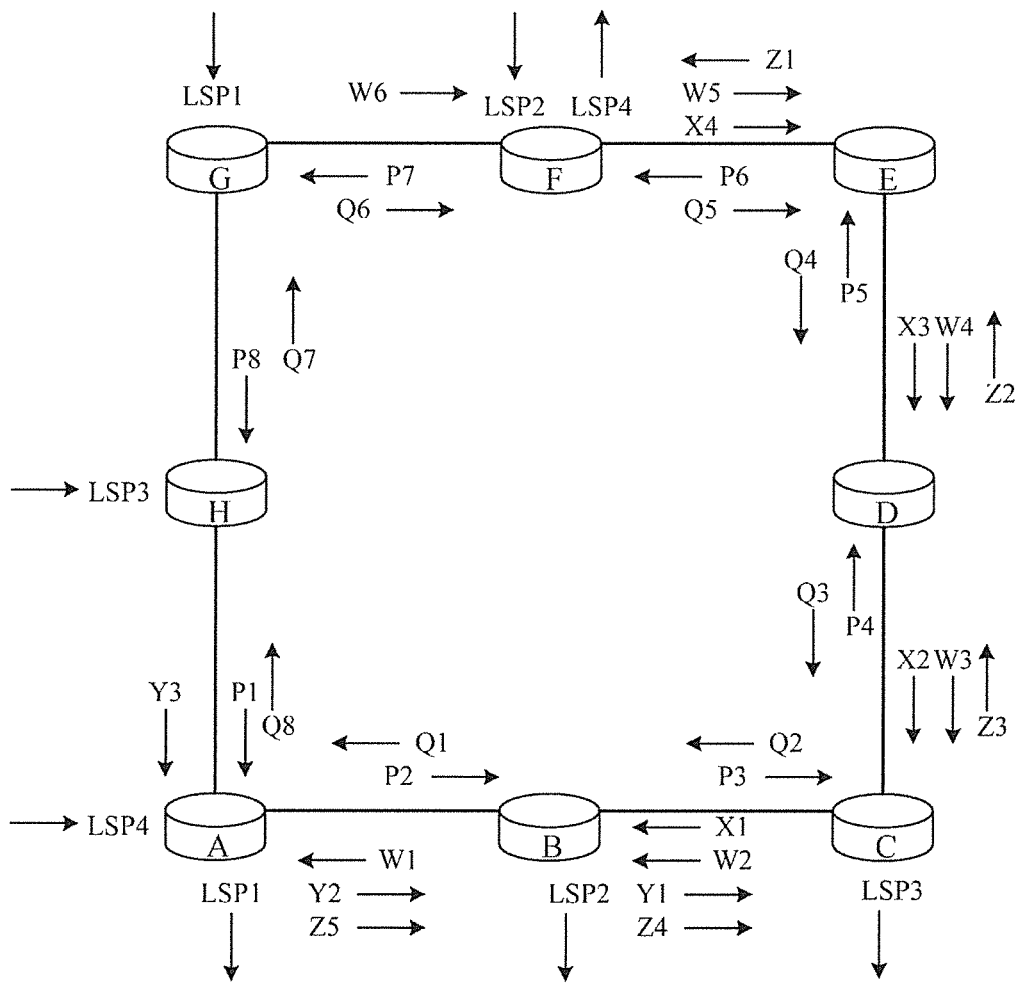
FIG. 8 is a schematic diagram illustrating a work LSP and a protection LSP loop configured on two directions in a ring network according to an example of the present disclosure.

FIG. 8 is a schematic diagram illustrating a work LSP and a protection LSP loop configured on two directions in a ring network according to an example of the present disclosure.

In the ring network, besides the work LSP1 and LSP2 configured on the first direction S1 and the protection LSP loop configured on the second direction, a work LSP3 and a work LSP4 are configured on the second direction S2, and an ingress node and an egress node of the work LSP3 are LSR H and LSR C respectively, an ingress node and an egress node of the work LSP4 are LSR A and LSR F respectively. Besides the ingress node LSR H, the work LSP3 includes LSR A~LSR C on the second direction S2, and incoming working labels of LSR A~LSR C on the work LSP1 are Y3~Y1 respectively. Besides the ingress node LSR A, the work LSP4 includes LSR B~LSR F on the second direction S2, and incoming working labels of LSR B~LSR F on the work LSP4 are Z5-Z1 respectively.

Another protection LSP loop is configured on the first direction S1 for the work LSP3 and the work LSP4, and the protection LSP loop used by the work LSP3 and the work LSP4 at the same time includes LSR A~LSR H, and incoming protection labels of LSR A~LSR H on the protection LSP loop are Q1~Q8 respectively.

The method for notifying of the failure used when the multi-node failure occurs on the LSRs of the work LSP3 and the work LSP4 is the same as the method used when the multi-node failure occurs on the LSRs of the work LSP1 and the work LSP2, and is not described herein.

In addition, the message formats of the SF message, RT message, WTR message, RO message, and NR message are shown in FIG. 9, which are the message formats of the MR-PSC protocol. In the message format:

the version number field indicates version information;

the value of the protocol type filed is MR-PSC, which indicates that the message is implemented by using the MR-PSC protocol;

the source router identity field indicates an identity of the router sending the message;

the target router identity field indicates an identity of the target router of the message;

the message type field indicates the type of the message, when the field indicates an identifier corresponding to SF, the message is the SF message; when the field indicates an identifier corresponding to RT, the message is the RT message; when the field indicates an identifier corresponding to WTR, the message is the WTR message; when the field indicates an identifier corresponding to RO, the message is the RO message; when the field indicates an identifier corresponding to NR, and the message is the NR message; and when the contents of the restoration mode field is an identifier corresponding to the unrecoverable mode, this is an indication that the restoration mode supported by the router sending the message is the unrecoverable mode; when the contents of the restoration field is an identifier corresponding to the recoverable mode, this is an indication that the restoration mode supported by the router sending the message is the recoverable mode.

It should be noted that, when the LSR detects the link failure between the LSR and the upstream neighbor on the first direction S1, the target LSR identifier in the SF message is unknown, because when the link failure is detected, the unique target LSR cannot be determined. The target LSR identifier in the other four messages is the identifier of the target LSR because the unique target LSR can be determined according to the received message. Taking the WTR message as an example, when the LSR receives the WTR message, one unique LSR may be determined according to the source router identifier in the WTR message, and the RO message is sent when the determined router is taken as the target router. In fact, the RT message, WTR message, RO message, and NR message may not carry the target router identifier.

In addition, if only one protection LSP loop with the opposite direction of the work LSP is configured in the ring network (as shown in FIG. 4), the above described SF message, RT message, WTR message, RO message, and NR message only may be sent via the MPLS TP section layer. If two protection LSP loops that are in two directions are configured in the ring network (as shown in FIG. 8), the above described SF message, RT message, WTR message, RO message, and NR message may be sent via the MPLS TP section layer or via the protection LSP loop along the first direction.

When the message is sent via the MPLS TP section layer, MPLS encapsulation is performed for the message format shown in FIG. 9, and the format of the encapsulated MR-PSC message is shown in FIG. 10. FIG. 10 is a schematic diagram illustrating a packet encapsulation format when a message shown in FIG. 9 is transmitted in a Section layer according to an example of the present disclosure. The two-layer packet head is the MPLS packet head, the value of GAL being 13 indicates the type of the packet is an Operation Administration and Maintenance (OAM) type, and the message body is the message contents shown in FIG. 9. In the following figures, G is used to represent contents including L2 Header and GAL fields, and Req is used to represent message contents, when Req is SF, this is an indication of a SF message, when Req is WTR, this is an indication of a WTR message, and the rest may be deduced by analogy.

When the message is sent via the protection LSP loop, MPLS encapsulation and protection label encapsulation are performed for the message format shown in FIG. 9 and the format of the encapsulated MR-PSC message is shown in FIG. 11. FIG. 11 is a schematic diagram illustrating a packet encapsulation format when a message shown in FIG. 9 is transmitted in via a protection LSP loop according to an example of the present disclosure. The two-layer packet head is the MPLS packet head, the protection LSP label is the incoming working label of the downstream neighbor LSR on the protection LSP loop of the first direction, the value of GAL being 13 indicates the type of the packet is OAM type, and the message body is the message content shown in FIG. 9. In the following figures, PX is used to represent a protection label, G is used to represent contents including L2 Header and GAL fields, Req is used to represent message contents, when Req is SF, this is an indication of a SF message, when Req is WTR, this is an indication of a WTR message, the rest may be deduced by analogy.

Based on FIGS. 12a and 12b, transmitting the SF message via the Section layer and the protection LSP loop will be described.

Figure 12A:
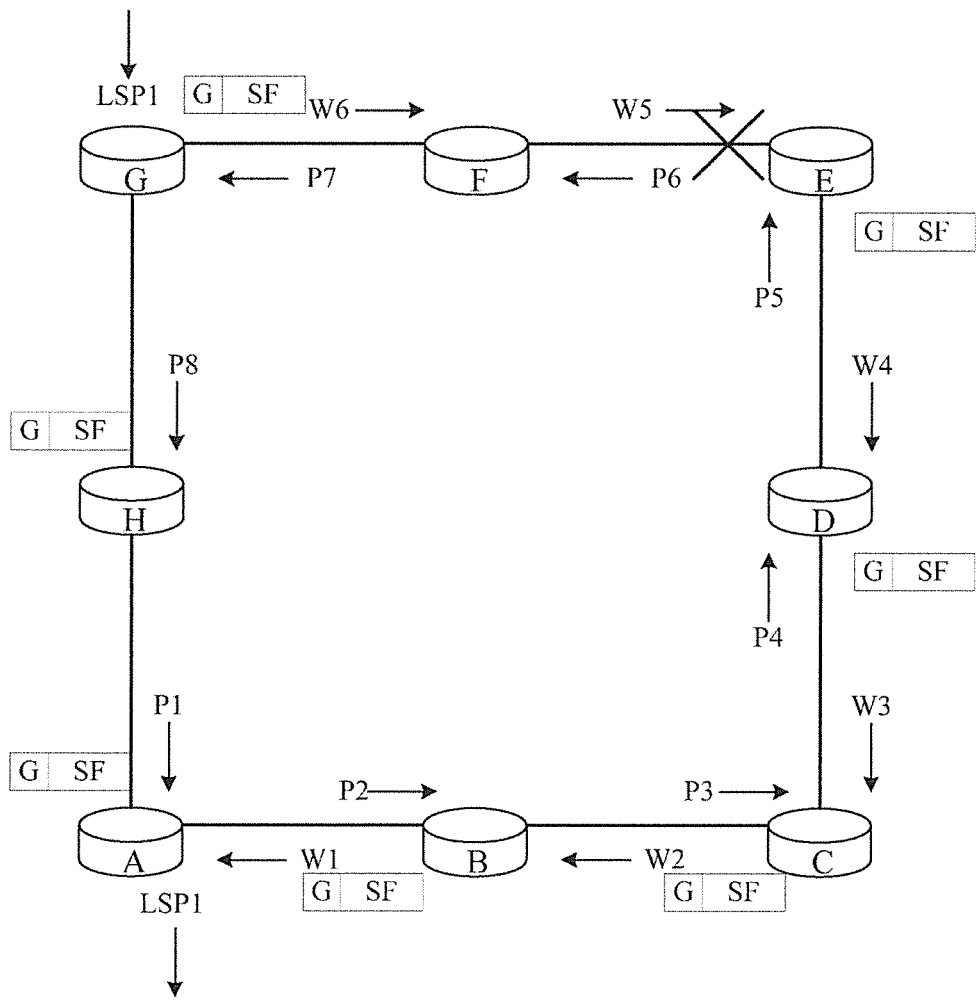
FIG. 12a is a schematic diagram illustrating transmission of a SF message in a MMPLS TP Section layer in a ring network shown in FIG. 4 according to an example of the present disclosure.

FIG. 12a is a schematic diagram illustrating transmission of a SF message in a MMPLS TP Section layer in a ring network shown in FIG. 4 according to an example of the present disclosure. Only the work LSP1 is shown, and the work LSP2 is not shown. It is supposed that LSR E is failed. LSR D detects the link between LSR D and LSR E, which is the upstream neighbor of LSR D on the first direction S1, is failed, and sends a SF message, which is represented as two rectangular blocks. The character "G" in first rectangular block is GAL, the character string "SF" in the second rectangular block indicates that the message is a SF message. The SF message is transmitted via LSR C, B, A, H, G, F. The contents of the SF message are unchanged in the above transmission procedure.

Figure 12B:
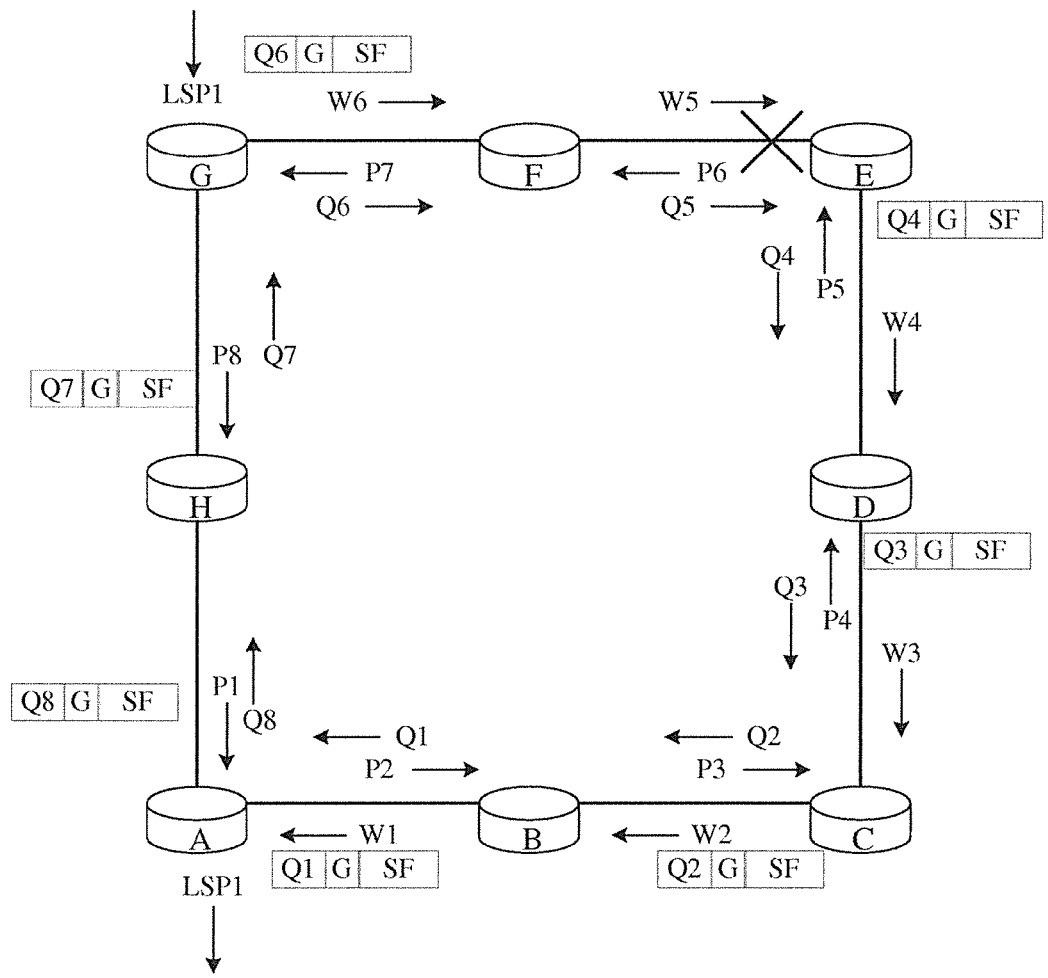
FIG. 12b is a schematic diagram illustrating transmission of a SF message via a protection LSP loop on a first direction 51 in a ring network shown in FIG. 4 according to an example of the present disclosure.

FIG. 12b is a schematic diagram illustrating transmission of a SF message via a protection LSP loop on a first direction 51 in a ring network shown in FIG. 4 according to an example of the present disclosure. It is supposed that LSR E is failed. LSR D detects the link between LSR D and LSR E, which is the upstream neighbor of LSR D on the first direction S1, is failed, and sends a SF message, which is represented as three rectangular blocks. The first rectangular block is a protection label, the character "G" in the second rectangular block is GAL, and the character string "SF" in the third rectangular block indicates that the message is a SF message. The SF message is transmitted via LSR C, B, A, H, G, F.

When each of LSR C, B, A, H, G receives the SF message carrying the incoming working label of the LSR on the protection LSP loop of the first direction S1, the LSR swaps the incoming working label of the LSR on the protection LSP loop of the first direction S1 for the incoming working label of a downstream neighbor on the protection LSP loop of the first direction S1, and sends the packet to the downstream neighbor along the first direction S1.

FIGS. 12a and 12b describe that the SF message is transmitted along the first direction S1 via the Section layer and the protection LSP loop when the node failure or link failure occurs on the LSRs included in the work LSP on the first direction S1. The procedure of transmitting other messages, e.g., RT message, WTR message, RO message, and NR message via the Section layer and the protection LSP loop is similar to those shown in FIGS. 12a and 12b, and will not be described herein. In addition, when the node failure or link failure occurs on the LSRs included in the work LSP on the first direction S2, the procedure of transmitting the SF message, RT message, WTR message, RO message, and NR message via the Section layer and the protection LSP loop is similar to those shown in FIGS. 12a and 12b, and will not be described herein.

It should be noted that, in the above descriptions, the SF message, RT message, WTR message, RO message, and NR message are all sent via the first direction. Practically, when being transmitted via the MPLS TP Section layer, the WTR message, RO message, and NR message may be transmitted along the first direction or the second direction, and the SF message and the RT message may only be transmitted along the first direction. When being transmitted via the protection LSP loop of the first direction, all the notification messages may be transmitted only via the first direction.

Based on the above descriptions, a method and apparatus for notifying of a LSP failure are provided by examples of the present disclosure.

Figure 13:
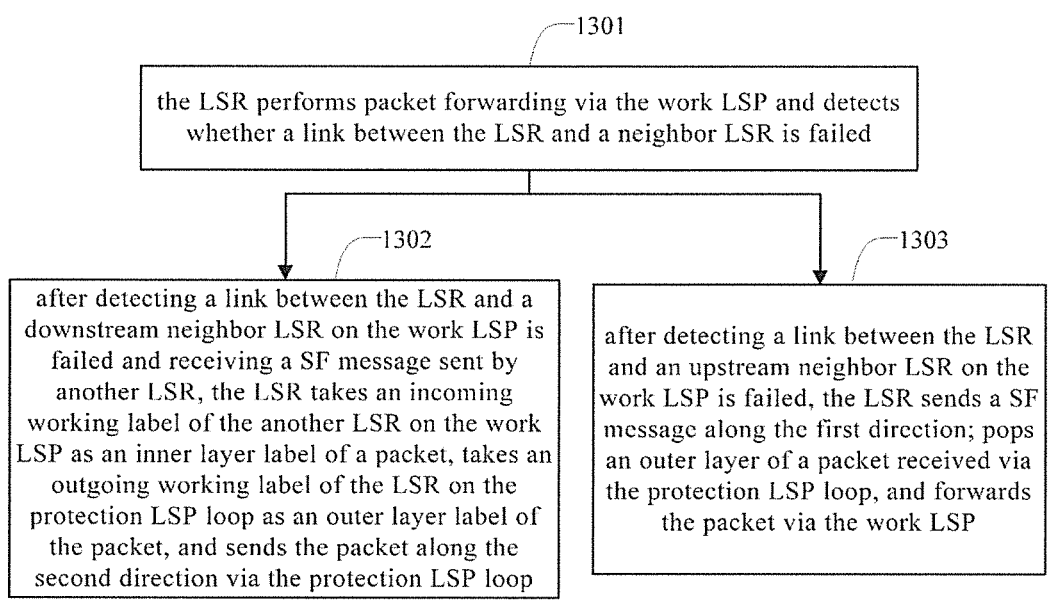
FIG. 13 is a flowchart illustrating a method for notifying of a LSP failure according to an example of the present disclosure.

FIG. 13 is a flowchart illustrating a method for notifying of a LSP failure according to an example of the present disclosure. The method is applied to a LSR in a ring network that uses MPLS TP. The ring network includes at least one work LSP forwarding packet along a first direction and a protection LSP loop forwarding packet along a second direction, in which the first direction is opposite to the second direction. The method includes the following operations.

In block 1301, the LSR performs packet forwarding via the work LSP and detects whether a link between the LSR and a neighbor LSR is failed.

In block 1302, after detecting a link between the LSR and a downstream neighbor LSR on the work LSP is failed and receiving a SF message sent by another LSR, the LSR takes an incoming working label of the another LSR on the work LSP as an inner layer label of a packet, takes an outgoing working label of the LSR on the protection LSP loop as an outer layer label of the packet, and sends the packet along the second direction via the protection LSP loop.

In block 1303, after detecting a link between the LSR and an upstream neighbor LSR on the work LSP is failed, the LSR sends a SF message along the first direction, pops an outer layer of a packet received via the protection LSP loop, and forwards the packet via the work LSP.

According to an example, the SF message carries a restore mode.

After receiving the SF message sent by the another LSR, the LSR further determines whether the restore mode carried in the SF message is identical with the restore mode of the LSR. If the restore mode carried in the SF message is different from the restore mode of the LSR, the LSR generates system alarm information. If the restore mode carried in the SF message is identical with the restore mode of the LSR, the LSR keeps notifying the failure.

In the example shown in FIG. 13, after receiving the SF message sent by the another LSR, the LSR further sends a restore test (RT) message along the first direction.

After sending the SF message along the first direction, the LSR further stops sending the SF message when receiving the RT message along the first direction, and sends a wait to restore (WTR) message.

In the example shown in FIG. 13, after sending the RT message along the first direction, the LSR further sends a restore over (RO) message when receiving the WTR message.

After sending the WTR message, the LSR further sends a no request (NR) message when receiving the RO message, and the link between the LSR and the upstream neighbor LSR on the work LSP is restored.

In the example shown in FIG. 13, the SF message, the RT message, the WTR message, the RO message, and the NR message may be received and/or sent on a MPLS TP Section layer.

In addition, if the ring network also includes a protection LSP loop on the first direction, the SF message, the RT message, the WTR message, the RO message, and the NR message may be received and/or sent via the protection LSP loop along the first direction.

Figure 14:
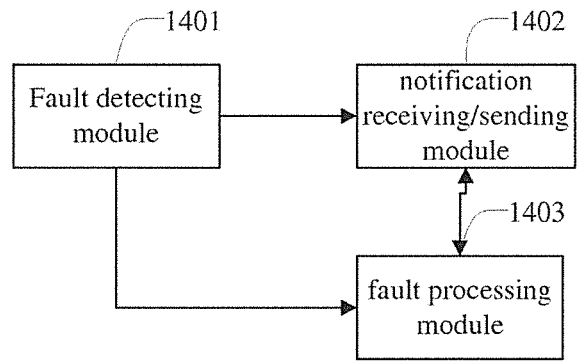
FIG. 14 is a schematic diagram illustrating an apparatus for notifying of a LSP failure according to an example of the present disclosure.

FIG. 14 is a schematic diagram illustrating an apparatus for notifying a LSP failure according to an example of the present disclosure. The apparatus is applied to a LSR in a ring network of MPLS TP. The ring network includes at least one work LSP performing packet forwarding along a first direction and a protection LSP loop performing packet forwarding along a second direction, the first direction is opposite to the second direction. The apparatus includes a failure detecting module 1401, a notification receiving/sending module 1402, and a failure processing module 1403. The modules may for example be implemented by one or more processors.

The failure detecting module 1401 is to detect whether a link between the LSR and a neighbor LSR is failed.

The notification receiving/sending module 1402 is to determine whether a SF message is received from another LSR and to send a SF message along the first direction after the failure detecting module 1401 detects a link between the LSR and an upstream neighbor LSR on the work LSP is failed.

The failure processing module 1403 is to, after the failure detecting module 1401 detects a link between the LSR and a downstream neighbor LSR on the work LSP is failed and the notification receiving/sending module 1402 receives the SF message sent by the another LSR, take an incoming working label of the another LSR on the work LSP as an inner layer label of a packet, take an outgoing working label of the LSR on the protection LSP loop as an outer layer label of the packet, and send the packet along the second direction via the protection LSP loop. After the failure detecting module 1401 detects a link between the LSR and an upstream neighbor LSR on the work LSP is failed, the failure processing module 1403 is to pop an outer layer of a packet received via the protection LSP loop and forward the packet via the work LSP.

The SF message sent by the notification receiving/sending module 1402 along the first direction carries a restore mode.

After the failure detecting module 1401 detects the link between the LSR and the downstream neighbor LSR on the work LSP is failed and the notification receiving/sending module 1402 receives the SF message sent by the another LSR, the failure processing module 1403 is further to determine whether the restore mode carried in the SF message is identical with the restore mode of the LSR. If the restore mode carried in the SF message is different from the restore mode of the LSR, the failure processing module 1403 is to generate system alarm information. If the restore mode carried in the SF message is identical with the restore mode of the LSR, the failure processing module 1403 is to keep notifying of the failure.

The notification receiving/sending module 1402 is to, after receiving the SF message sent by the another LSR and the failure processing module 1403 detects the link between the LSR and the downstream neighbor LSR on the work LSP is failed, send a RT message along the first direction.

The notification receiving/sending module 1402 is further to, after sending the SF message along the first direction, send a WTR message when receiving the RT message along the first direction.

The notification receiving/sending module 1402 is further to, after sending the RT message along the first direction, send a RO message when receiving the WTR message.

The notification receiving/sending module 1402 is further to, after sending the WTR message, send a NR message when receiving the RO message, and the link between the LSR and the upstream neighbor LSR on the work LSP is restored.

The notification receiving/sending module 1402 receives and/or sends the SF message, the RT message, the WTR message, the RO message, and the NR message on a MPLS TP Section layer. If the ring network also includes a protection LSP loop on the first direction, the notification receiving/sending module 1402 is to receive and/or send the SF message, the RT message, the WTR message, the RO message, and the NR message via the protection LSP loop along the first direction.

Figure 15:
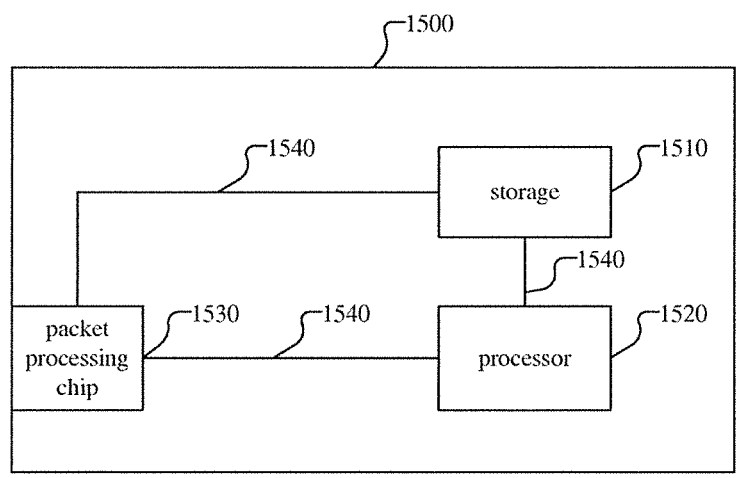
FIG. 15 is a schematic diagram illustrating a hardware structure for notifying of a LSP failure according to an example of the present disclosure.

An example hardware structure of the apparatus for notifying the failure will be described hereinafter. The apparatus may be a programmable device. FIG. 15 is a schematic diagram illustrating a hardware structure for notifying of a LSP failure according to an example of the present disclosure. The apparatus includes a storage 1510, a processor 1520, a packet processing chip 1530, and an interconnection 1540 coupling the storage 1510, the processor 1520, and the packet processing chip 1530.

The storage 1510 is to store instruction codes. When being executed, the instruction codes implement the functions of the failure detecting module in the apparatus for notifying of the LSP failure and process failure notification messages including the SF message, the RT message, the WTR message, the RO message, and the NR message.

The processor 1520 is to communicate with the packet processing chip 1530, receive and send the failure notifying messages, communicate with the storage, read and execute the instruction codes in the storage 1510, implement the functions of the failure detecting module in the apparatus for notifying the LSP failure, and process the failure notification message sent by the packet processing chip 1530.

The packet processing chip 1530 is to connect to other LSRs via interfaces on the chip, process data packets, receive and send the failure notification packets including the SF message, the RT message, the WTR message, the RO message, and the NR message, receive the failure notification packets from the processor 1520 or send the failure notification packets to the processor 1520.

It should be noted that, the apparatus for notifying of the LSP failure shown in FIG. 15 is merely a specific example and different structures may be used to implement the apparatus. For example, operations corresponding to the instruction codes may be implemented by an Application Specific Integrated Circuit (ASIC) or Network Processor (NP). In addition, there are one or multiple processors 1520. If there are multiple processors 1520, the multiple processors read and execute the instruction codes together. Hence, the detailed structures of the apparatus for notifying the LSP failure are not limited to what has been described in the present disclosure.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for notifying of a Label Switched Path (LSP) failure, applied to a Label Switching Router (LSR) in a ring network that uses Multi-Protocol Label Switching Transport Profile (MPLS TP), the ring network comprising at least one work LSP forwarding packets along a first direction and a protection LSP loop forwarding packets along a second direction, the first direction being opposite to the second direction, and the method comprising:
   forwarding packets via the work LSP and detecting whether a link between the LSR and a neighbor LSR has failed; and
   in response to detecting that a link between the LSR and a downstream neighbor LSR on the work LSP has failed and receiving a Signal Failure (SF) message sent by another LSR on the work LSP, inserting into a packet an incoming working label of the another LSR as an inner layer label of the packet, inserting into the packet an outgoing working label of the LSR on the protection LSP loop as an outer layer label of the packet, and sending the packet along the second direction via the protection LSP loop.

2. The method of claim 1, further comprising:
   in response to detecting that a link between the LSR and an upstream neighbor LSR on the work LSP has failed, sending a SF message along the first direction, popping an outer layer of a packet received via the protection LSP loop, and forwarding the packet via the work LSP.

3. The method of claim 1, further comprising:
   sending a Restore Test (RT) message along the first direction after receiving the SF message sent by the another LSR, wherein the RT message is to determine whether the link between the LSR and the downstream neighbor LSR has been restored.

4. The method of claim 3, after sending the SF message along the first direction, the method further comprising:
   when receiving the RT message along the first direction, stopping sending of the SF message along the first direction and sending a Wait to Restore (WTR) message along the first direction, wherein the WTR message is to notify that the link between the LSR and the upstream neighbor LSR of the work LSP has been restored.

5. The method of claim 4, the method further comprising:
   sending a Restore Over (RO) message along the first direction when receiving the WTR message, wherein the RO message is to notify that the link restoration has finished.

6. The method of claim 5, the method further comprising:
   sending a No Request (NR) message along the first direction when receiving the RO message.

7. The method of claim 6, wherein the ring network comprises a protection LSP loop on the first direction, and wherein the SF message, the RT message, the WTR message, the RO message, and the NR message are received or sent via the protection LSP loop on the first direction.

8. An apparatus for notifying of a Label Switched Path (LSP) failure, applied to a Label Switching Router (LSR) in a ring network that uses Multi-Protocol Label Switching Transport Profile (MPLS TP), the ring network comprising at least one work LSP forwarding packet along a first direction and a protection LSP loop forwarding packet along a second direction, the first direction being opposite to the second direction, wherein the apparatus comprises:
  a failure detecting module, a notification receiving/sending module and a failure processing module;
  the failure detecting module is to detect whether a link between the LSR and a neighbor LSR has failed;
  the notification receiving/sending module is to determine whether a signal failure (SF) message is received from another LSR; and
  the failure processing module is to, after the failure detecting module has detected that a link between the LSR and a downstream neighbor LSR on the work LSP has failed and the notification receiving/sending module has received the SF message sent by the another LSR, insert into a packet an incoming working label of the another LSR on the work LSP as an inner layer label of the packet, insert into the packet an outgoing working label of the LSR on the protection LSP loop as an outer layer label of the packet, and send the packet along the second direction via the protection LSP loop.

9. The apparatus of claim 8, wherein
  the notification receiving/sending module is further to send a Signal Failure (SF) message along the first direction after the failure detecting module has detected that a link between the LSR and an upstream neighbor LSR has failed; and
  the failure processing module is further to, after the failure detecting module has detected that a link between the LSR and the upstream neighbor LSR on the work LSP has failed and the notification receiving/sending module has received a packet via the protection LSP loop, pop an outer layer of the packet received via the protection LSP loop, and forward the packet via the work LSP.

10. The apparatus of claim 8, wherein the notification receiving/sending module is further to, after the SF message sent by the another LSR has been received and a failure in the link between the LSR and the downstream neighbor LSR on the work LSP has been detected by the failure detecting module, send a Restore Test (RT) message along the first direction, wherein the RT message is to determine whether the link between the LSR and the downstream neighbor LSR has been restored.

11. The apparatus of claim 10, wherein the notification receiving/sending module is further to, after the SF message has been sent along the first direction, send a Wait to Restore (WTR) message along the first direction when the RT message is received along the first direction, wherein the WTR message is to notify that the link between the LSR and the upstream neighbor LSR of the work LSP has been restored.

12. The apparatus of claim 11, wherein the notification receiving/sending module is further to, after the RT message has been sent along the first direction, send a Restore Over (RO) message along the first direction when the WTR message is received, wherein the RO message is to notify that the link restoration has finished.

13. The apparatus of claim 12, wherein the notification receiving/sending module is further to send a No Request (NR) message when the RO message is received.

14. The apparatus of claim 13, wherein the notification receiving/sending module is to receive and send the SF message, the RT message, the WTR message, the RO message, and the NR message on a MPLS TP Section layer.

15. The apparatus of claim 14, wherein the ring network comprises a protection LSP loop on the first direction, and wherein the notification receiving/sending module is to receive or send the SF message, the RT message, the WTR message, the RO message, and the NR message via the protection LSP loop on the first direction.

16. A non-transitory computer readable storage medium storing instructions applied to a Label Switching Router (LSR) in a ring network that uses Multi-Protocol Label Switching Transport Profile (MPLS TP), the ring network comprising at least one work Label Switched Path (LSP) forwarding packet along a first direction and a protection LSP loop forwarding packet along a second direction, the first direction being opposite to the second direction, wherein the instructions are executable by a processor cause the processor to:
  forward packets via the work LSP and detect whether a link between the LSR and a neighbor LSR has failed; and
  in response to detecting that a link between the LSR and a downstream neighbor LSR on the work LSP has failed and receiving a Signal Failure (SF) message sent by another LSR on the work LSP, insert into a packet an incoming working label of the another LSR as an inner layer label of the packet, insert into the packet an outgoing working label of the LSR on the protection LSP loop as an outer layer label of the packet, and send the packet along the second direction via the protection LSP loop.

17. The non-transitory computer readable storage medium of claim 16, the instructions are further to cause the processor to:
  send a Restore Test (RT) message along the first direction after receiving the SF message sent by the another LSR, wherein the RT message is to determine whether the link between the LSR and the downstream neighbor LSR has been restored.

18. The non-transitory computer readable storage medium of claim 17, the instructions are further to cause the processor to:
  when receiving the RT message along the first direction, stop sending of the SF message along the first direction and send a Wait to Restore (WTR) message along the first direction, wherein the WTR message is to notify that the link between the LSR and the upstream neighbor LSR of the work LSP has been restored.

19. The non-transitory computer readable storage medium of claim 18, the instructions are further to cause the processor to:
  send a Restore Over (RO) message along the first direction when receiving the WTR message, wherein the RO message is to notify that the link restoration has finished.

* * * * *